United States Patent
Lee et al.

(10) Patent No.: US 9,130,723 B2
(45) Date of Patent: Sep. 8, 2015

(54) METHOD AND DEVICE FOR ACQUIRING RESOURCE FOR UPLINK CONTROL CHANNEL IN WIRELESS COMMUNICATION SYSTEM

(75) Inventors: Hyun Woo Lee, Anyang-si (KR); Hyuk Min Son, Anyang-si (KR); Hye Young Choi, Anyang-si (KR); Seung Hee Han, Anyang-si (KR); Jin Min Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 14/237,663

(22) PCT Filed: Aug. 10, 2012

(86) PCT No.: PCT/KR2012/006360
§ 371 (c)(1),
(2), (4) Date: Feb. 7, 2014

(87) PCT Pub. No.: WO2013/025005
PCT Pub. Date: Feb. 21, 2013

(65) Prior Publication Data
US 2014/0192757 A1 Jul. 10, 2014

Related U.S. Application Data

(60) Provisional application No. 61/522,700, filed on Aug. 12, 2011, provisional application No. 61/536,071, filed on Sep. 19, 2011, provisional application No. 61/560,761, filed on Nov. 16, 2011.

(51) Int. Cl.
*H04W 4/00* (2009.01)
*H04L 5/00* (2006.01)
*H04W 72/04* (2009.01)

(52) U.S. Cl.
CPC .............. *H04L 5/0055* (2013.01); *H04L 5/0007* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2009/0245194 A1 | 10/2009 | Damnjanovic et al. | |
| 2011/0310856 A1* | 12/2011 | Hariharan et al. | 370/336 |
| 2012/0113948 A1* | 5/2012 | Kwon et al. | 370/329 |
| 2012/0320848 A1* | 12/2012 | Chen et al. | 370/329 |
| 2013/0034064 A1* | 2/2013 | Nam et al. | 370/329 |
| 2013/0039291 A1* | 2/2013 | Blankenship et al. | 370/329 |
| 2013/0044692 A1* | 2/2013 | Nory et al. | 370/329 |

FOREIGN PATENT DOCUMENTS

| | | | |
|---|---|---|---|
| KR | 1020110020732 A | 3/2011 | |
| WO | 2010053984 A2 | 5/2010 | |
| WO | 2010110598 A2 | 9/2010 | |

* cited by examiner

*Primary Examiner* — Otis L Thompson, Jr.
(74) *Attorney, Agent, or Firm* — Dentons US LLP

(57) ABSTRACT

Provided are a method and device for acquiring a PUCCH (physical uplink control channel) resource index in a wireless communication system. A terminal acquires a PUCCH resource index indicating a dynamic PUCCH region corresponding to an e-PDCCH (enhanced physical downlink control channel). The PUCCH resource index is acquired based on the smallest CCE (control channel element) index wherein the e-PDCCH is allocated, and a first dynamic PUCCH region corresponding to the e-PDCCH is not overlapped with the dynamic PUCCH region corresponding to PDCCH.

14 Claims, 19 Drawing Sheets

METHOD AND DEVICE FOR ACQUIRING RESOURCE FOR UPLINK CONTROL CHANNEL IN WIRELESS COMMUNICATION SYSTEM

This application is a 35 USC §371 National Stage entry of International Application No. PCT/KR2012/006360, filed on Aug. 10, 2012, and claims priority of U.S. Provisional Application Nos. 61/522,700 filed Aug. 12, 2011, 61/536,071 filed Sep. 19, 2011, and 61/560,761 filed Nov. 16, 2011 which are each hereby incorporated by reference in its entirety.

BACKGROUND OF THE INVENTION

1. Field of the Invention

The present invention relates to wireless communications, and more particularly, to a method and apparatus for acquiring a resource for an uplink control channel in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

A cellular network based wireless communication system includes a homogeneous network or a heterogeneous network and interferences may occur among homogeneous base stations in the homogeneous network and among heterogeneous base stations in the heterogeneous network. Interference by other base stations may influence even a control channel as well as a data channel. Downlink control channels including a physical downlink control channel (PDCCH), a physical control format indicator channel (PCFICH), a physical HARQ indicator channel (PHICH), etc, may be transmitted in all subframes and may be allocated to an entire downlink bandwidth to be transmitted, and as a result, it is difficult to avoid the interference by other base station rather than the data channel.

In order to reduce the influence of the interference, introduction of a new control channel is discussed in addition to a current PDCCH. The new introduced control channel may be an enhanced PDCCH (e-PDCCH). The e-PDCCH may be defined to reduce the influence of the interference or introduce a new transmission mode. For example, the e-PDCCH may be defined to effectively support coordinated multi-point (CoMP) transmission.

Meanwhile, an acknowledgement (ACK)/non-acknowledgement (NACK) signal which is a response to downlink transmission may be transmitted through a physical uplink control channel (PUCCH) resource determined based on the PDCCH. With the introduction of the e-PDCCH which is the new control channel, the PUCCH resource needs to be acquired based on the e-PDCCH.

SUMMARY OF THE INVENTION

The present invention provides a method and apparatus for acquiring a resource for an uplink control channel in a wireless communication system. The present invention provides a method for acquiring a PUCCH resource for transmitting an acknowledgement (ACK)/non-acknowledgement (NACK) signal from an enhanced physical downlink control channel (e-PDCCH) in a wireless communication system. Further, the present invention provides a method for applying an offset to the PUCCH resource determined based on the e-PDCCH so as to prevent the PUCCH resource determined based on the PDCCH and the PUCCH resource determined based on the e-PDCCH from being overlapped with each other.

In an aspect, a method for acquiring, by a user equipment, a physical uplink control channel (PUCCH) resource index in a wireless communication system is provided. The method includes acquiring a PUCCH resource index indicating a first dynamic PUCCH region corresponding to an enhanced physical downlink control channel (e-PDCCH), and transmitting an acknowledgement/non-acknowledgement (ACK/NACK) signal to a base station based on the acquired PUCCH resource index. The PUCCH resource index is acquired based on the smallest control channel element (CCE) index to which the e-PDCCH is allocated, and the first dynamic PUCCH region corresponding to the e-PDCCH is not overlapped with a second dynamic PUCCH region corresponding to a PDCCH.

The first dynamic PUCCH region may be allocated in a static PUCCH format 1/1a/1b region.

The first dynamic PUCCH region may be allocated in a direction in which an index is increased from a start point of the static PUCCH format 1/1a/1b region.

The first dynamic PUCCH region may be allocated in a direction in which an index is increased from an index separated from a start point of the static PUCCH format 1/1a/1b region by an offset.

The first dynamic PUCCH region may be allocated in a direction in which an index is decreased from an end point of the static PUCCH format 1/1a/1b region.

The first dynamic PUCCH region may be allocated in a direction in which an index is increased from an index separated from an end point of the static PUCCH format 1/1a/1b region by the offset.

The PUCCH resource index may be acquired based on an offset.

The offset may be applied to the smallest CCE index to which the e-PDCCH is allocated.

The offset may be applied to a search space to which the e-PDCCH is transmitted.

The offset may be applied to a variable Yk for determining a search space to which the e-PDCCH is transmitted.

The offset may be 1.

The offset may be applied when the smallest CCE index to which the e-PDCCH is allocated or an aggregation level is an even number.

In another aspect, a user equipment (UE) for acquiring a physical uplink control channel (PUCCH) resource index in a wireless communication system is provided. The UE includes a radio frequency (RF) for unit transmitting or receiving a radio signal, and a processor connected to the RF unit, and configured to acquire a PUCCH resource index indicating a first dynamic PUCCH region corresponding to an enhanced physical downlink control channel (e-PDCCH), and transmit an acknowledgement/non-acknowledgement (ACK/NACK) signal to a base station based on the acquired PUCCH resource index. The PUCCH resource index is acquired based on the smallest control channel element (CCE) index to which the e-PDCCH is allocated, and the first dynamic PUCCH region corresponding to the e-PDCCH is not overlapped with a second dynamic PUCCH region corresponding to a PDCCH.

The PUCCH resource can be effectively acquired based on the e-PDCCH.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
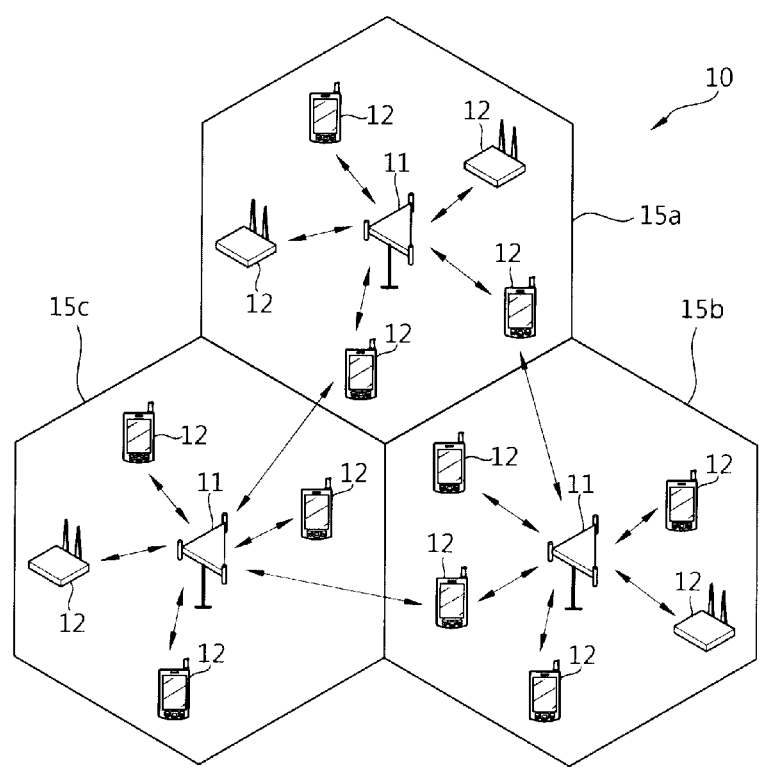
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
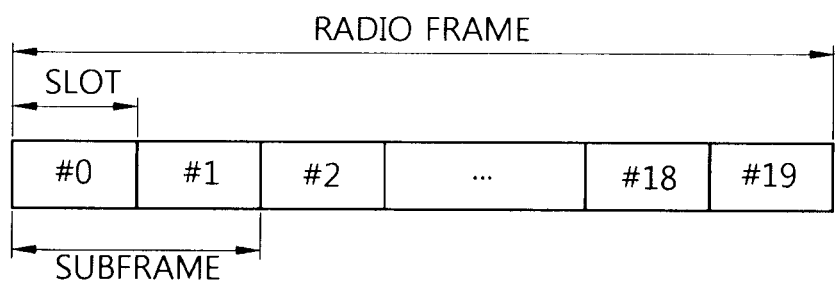
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
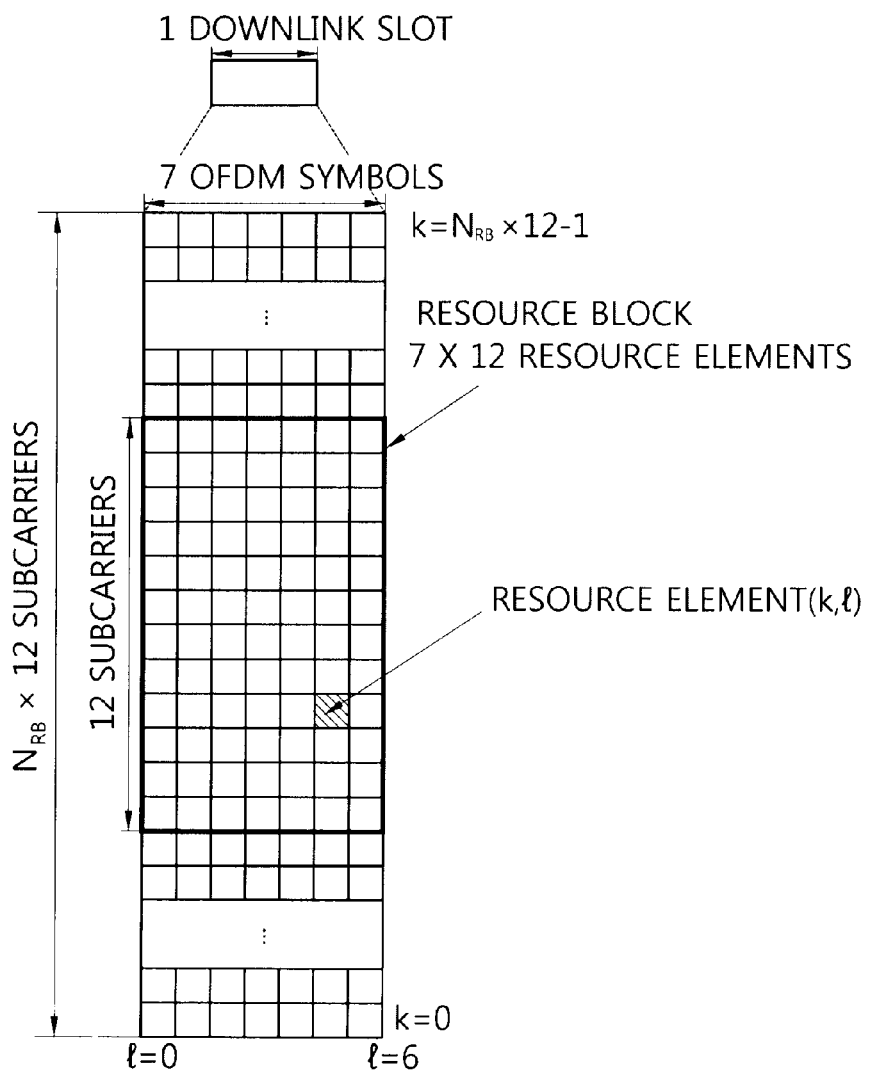
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indices (k,l) in the slot. Here, k (k=0, ..., $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
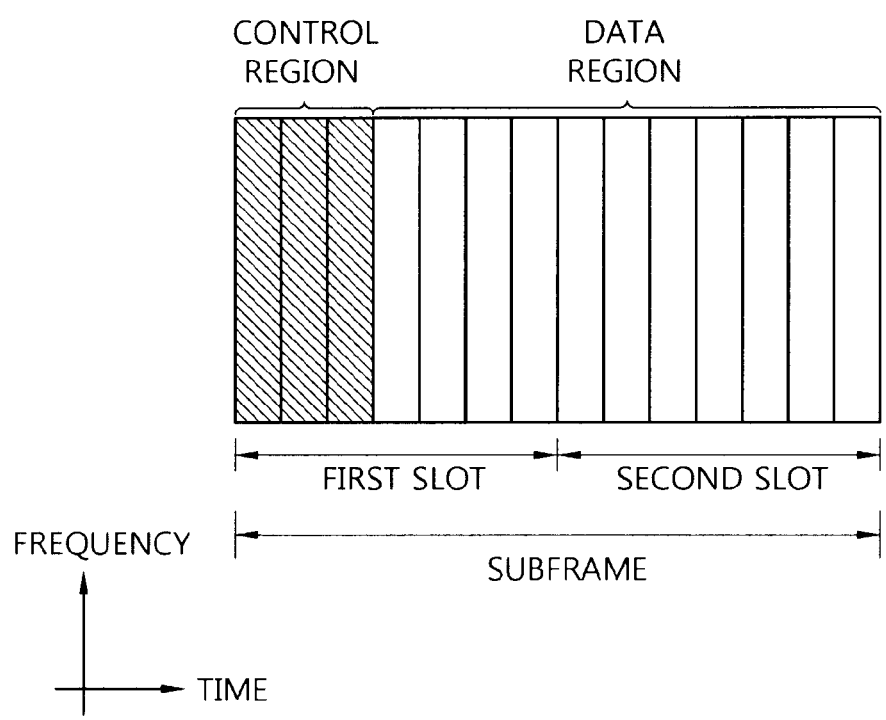
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to 9 resource element groups (REG) including respectively 4 resource elements. 4 quadrature phase shift keying (QPSK) symbols are mapped to each REG. Resource elements occupied by reference signals (RS) are not included in the REG, and the total number of REGs within a given OFDM symbol may be determined according to whether a cell-specific RS (CRS) exists. The format of the PDCCH and the number of bits of the possible PDCCH are determined according to the correlation between the number CCEs and the coding rate provided by the CCEs. The number of CCEs used for transmission of a specific PDCCH may be determined by the base station according to the channel situation. For example, the PDCCH for the UE having a superior channel state may use only one CCE. The PDCCH for the UE having an inferior channel state may need 8 CCEs in order to obtain sufficient robustness. Furthermore, the transmission power of the PDCCH may be adjusted according to the channel state.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

A restrictive set at the CCE position where the PDCCH may be located may be defined for each UE. The set of the CCE position where the PDCCH of each UE itself may be found is called a search space. The size of the search space is different according to the format of the PDCCH. The search space may be divided into a common search space (CSS) and a UE-specific search space (USS). The CSS is an area where the PDCCH which carries common control information is searched, and is a search area which is commonly configured for all UEs. The CSS is compose of 16 CCEs of CCE indices 0 to 15, and may support the PDCCH of aggregation levels 4 and 8. However, the DCI format 0/1A which carries UE-specific control information may be transmitted through the CSS. The USS is a dedicated search space for a specific UE. The USS may support the PDCCH of aggregation levels 1, 2, 4, and 8. For one UE, the CSS may overlap with the USS. Table 1 shows the aggregation level which is defined in the search area.

TABLE 1

| Search space $S_k^{(L)}$ | | | Number of PDCCH |
|---|---|---|---|
| Type | Aggregation level L | Size [in CCEs] | candidates $M^{(L)}$ |
| USS | 1 | 6 | 6 |
| | 2 | 12 | 6 |
| | 4 | 8 | 2 |
| | 8 | 16 | 2 |
| CSS | 4 | 16 | 4 |
| | 8 | 16 | 2 |

The UE blind-decodes a DCI format which is transmitted from the base station. The blind decoding is a scheme of determining whether the PDCCH is the UE's own control channel by checking a CRC error by demasking a desired identifier to the CRC of the received PDCCH. The UE does not know the position where the UE's PDCCH is transmitted within the control region, and the CCE aggregation level or DCI format which is used for the transmission. In order to reduce a calculation burden of the UE's blind decoding, the UE does not need to simultaneously search for all defined DCI formats. Generally, the UE may always search for the DCI format 0/1A in the USS. The DCI format 0 is used for the scheduling of the physical uplink shared channel (PUSCH). The DCI format 1A is used for the scheduling of the PDSCH and for the random access procedure which is initialized by the order of the PDCCH. The DCI format 0/1A may have the same size, and may be distinguished by a flag within the DCI format. Furthermore, the UE may be requested to further receive the DCI format 1/1B/2, etc, in the USS according to the PDSCH transmission mode which is configured by the base station. The UE may search form the DCI format 1A/1C in the CSS. Furthermore, the UE may be configured to search for the DCI format 3/3A, etc, in the CSS. The DCI format 3/3A has the same size as that of the DCI format 0/1A and may be distinguished by having a CRC which has been scrambled by the different identifiers. The UE may perform blind decoding up to 44 times within the subframe according to the transmission mode and the DCI format.

The control region of each serving cell is composed of a set of CCEs whose indices are 0 to $N_{CCE,k}-1$, and $N_{CCE,k}$ is the total number of CCEs within the control region of subframe k. The UE may monitor the PDCCH candidate set as configured by the higher layer on one or more activated serving cells. At this time, the monitoring is an attempt of respectively decoding the PDCCH within the PDCCH candidate set according to all monitored DCI formats. Search space $S_k^{(L)}$ in aggregation levels 1, 2, 4, or 8 may be defined by the PDCCH candidate set. In each serving cell where the PDCCH is monitored, the CCE corresponding to the PDCCH candidate m of the search space $S_k^{(L)}$ may be determined by Equation 1 below.

$$L\{(Y_k+m')\bmod \lfloor N_{CCE,k}/L\rfloor\}+i \qquad \text{<Equation 1>}$$

Here, i=0, 1, . . . , L−1, m=0, . . . , $M^{(L)}$−1. $M^{(L)}$ is the number of PDCCH candidates which are monitored in a given search space. If the carrier indicator field (CIF) is set to the UE in the USS, m'=m+$M^{(L)}n_{CI}$. $n_{CI}$ is the value of CIF. If the CIF is not set to the UE, m'=m. In the CSS, if aggregation level is 4 or 8, $Y_k$ is set to 0. In the USS $S_k^{(L)}$, if the aggregation level is L, $Y_k$ is determined by equation 2.

$$Y_k=(A\cdot Y_{k-1})\bmod D \qquad \text{<Equation 2>}$$

Here, Y−1=$n_{RNTI}$≠0, A=39827, D=65537, k=floor($n_s$/2), and $n_s$ is the slot number within a wireless frame.

Figure 5:
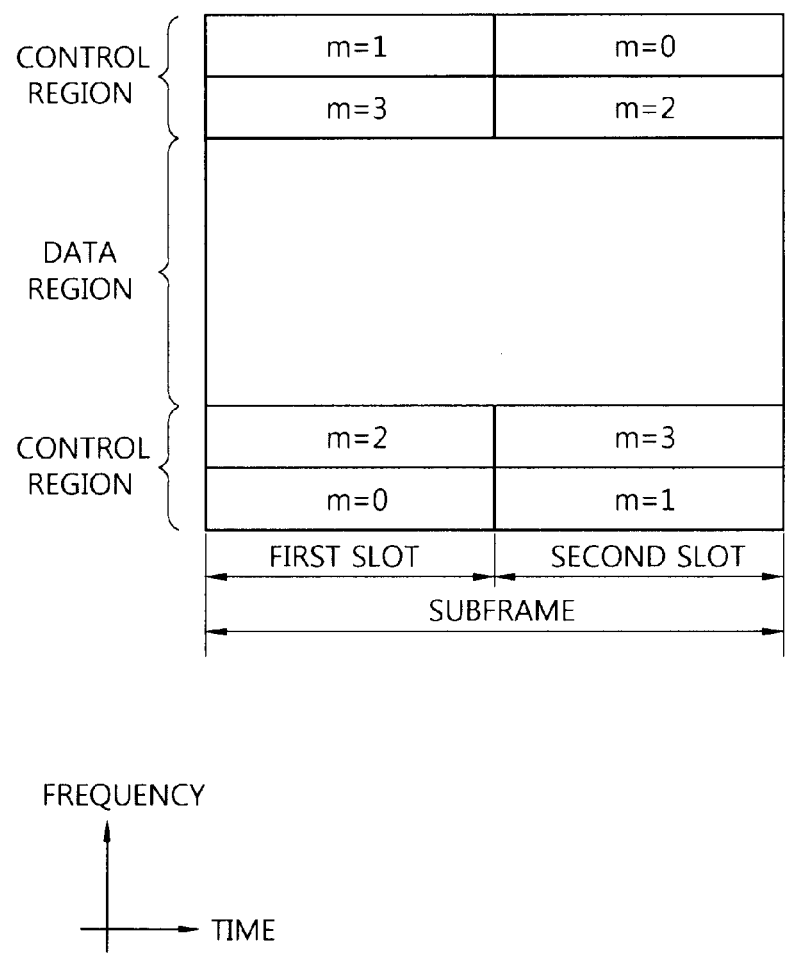
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement (ACK), a channel quality indicator (CQI) indicating the state of a downlink channel, a scheduling request (SR), and the like. Table 2 shows supported PUCCH formats.

TABLE 2

| PUCCH format | Modulation scheme | Number of bits per subframe ($M_{Bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

A PUCCH format 1 carries a positive SR. A PUCCH format 1a carries 1-bit HARQ-ACK with a positive SR. A PUCCH format 1b carries 2-bit HARQ-ACK with a positive SR. A PUCCH format 2 carries a CSI report when not multiplexed HARQ-ACK, or a CSI report multiplexed with HARQ-ACK for extended CP. A PUCCH format 2a carries a CSI report multiplexed with 1-bit HARQ-ACK for normal CP. A PUCCH format 2b carries a CSI report multiplexed with 2-bit HARQ-ACK for normal CP. A PUCCH format 3 carries up to 10-bit HARQ-ACK for FDD and for up to 20-bit HARQ-ACK for TDD. Or, A PUCCH format 3 carries up to 10-bit HARQ-ACK and 1-bit positive/negative SR for FDD and up to 20-bit HARQ-ACK and 1-bit positive/negative SR for TDD.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A PUCCH resource may be allocated through an implicit mapping method (alternatively, a dynamic mapping method) or an explicit mapping method (alternatively, a static mapping method). The implicit mapping method as a method in which a UE selects a PUCCH resource index based on a smallest CCE index of a PDCCH corresponding to DL transmission does not require separate signaling indicating the PUCCH resource index. That is, the PUCCH resource index in which an ACK/NACK signal for a specific PDSCH is transmitted may be determined by a predetermined rule based on a smallest CCE index $n_{CCE}$ of the PDCCH scheduling the PDSCH. For example, the PUCCH resource index may be determined as $n_{PUCCH}^{(1,p)} = n_{CCE} + N_{PUCCH}^{(1)}$ in an FDD system. In this case, $N_{PUCCH}^{(1)}$ is a value configured by a higher layer.

The explicit mapping method is a method in which a base station directly instructs the PUCCH resource index or a parameter associated with the PUCCH resource to a UE through such as a specific field in a DCI format, etc. For example, the base station may instruct four candidate PUCCH resource indices in which the ACK/NACK signal for an SPS PDSCH may be transmitted, to the UE through the higher layer. Thereafter, the base station may directly instruct to the UE through which PUCCH resource index the ACK/NACK signal for the SPS PDSCH is transmitted among four PUCCH resource indices configured by 2 bits in a transmit power control (TPC) field within the DCI format instructing SPS activation.

Figure 6:
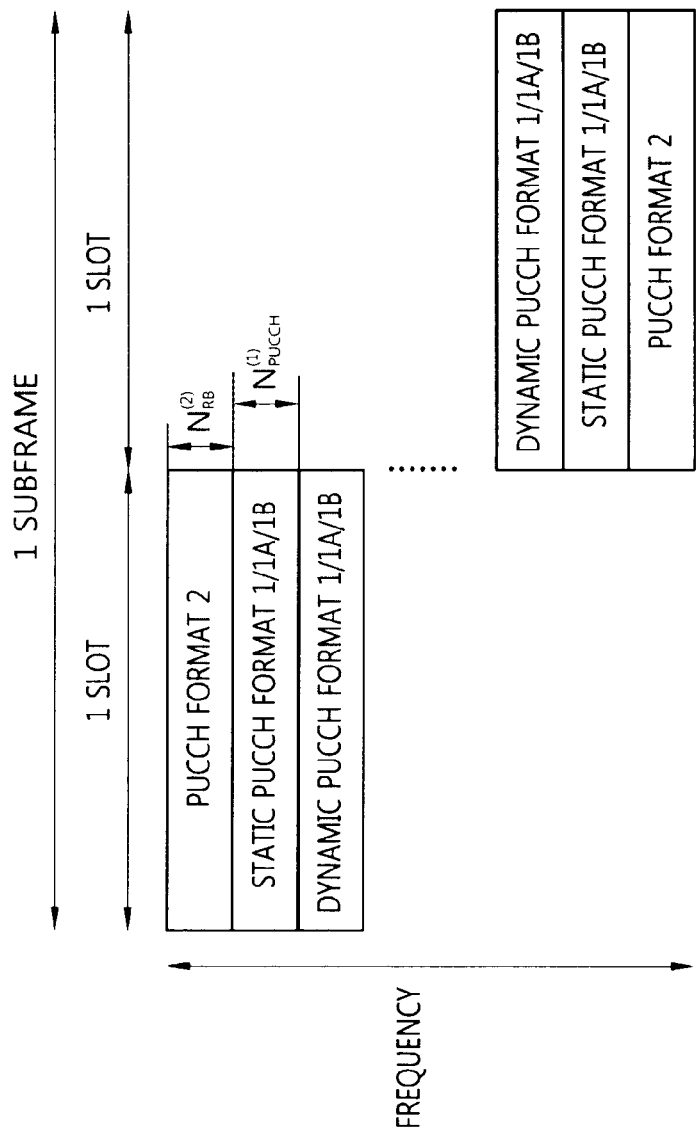
FIG. 6 shows an example of allocation of a PUCCH resource.

FIG. 6 shows an example of allocation of a PUCCH resource.

Referring to FIG. 6, PUCCH format 2 may be allocated to a resource as $N_{RB}^{(2)}$ which is earliest in a frequency domain of a first slot. Subsequently, a static PUCCH format 1/1a/1b may be allocated to a resource as $N_{PUCCH}^{(1)}$. Subsequently, a dynamic PUCCH format 1/1a/1b may be mapped by implicit mapping. A resource index of the PUCCH format 1/1a/1b may be determined as $n_{PUCCH} = n_{CCE} + N_{PUCCH}^{(1)}$ and $n_{CCE}$ is a smallest CCE index in which a PDCCH requiring transmission of the ACK/NACK signal or a PDCCH corresponding to a PDSCH requiring transmission of the ACK/NACK signal is detected. As a result, a dynamic PUCCH region is not overlapped with a static PUCCH region and the static PUCCH region may be placed in more front of the dynamic PUCCH region. $N_{RB}^{(2)}$ and $N_{PUCCH}^{(1)}$ may be given from a higher layer. An end of a region to which the dynamic PUCCH format 1/1a/1b is allocated is not determined and may be used as a base station intends to use the area.

A demand for higher data transmission rate have been increased, and accordingly, a carrier aggregation (CA) which supports a plurality of cells may be applied in a 3GPP LTE-A. The CA may be referred to as another name such as a bandwidth aggregation. The CA refers to forming a broadband by collecting one or more carrier having a bandwidth smaller than the broadband when a wireless communication system tries to support the broadband. The carrier which becomes a subject when collecting one or more carrier may use the bandwidth which is used in the existing system for backward compatibility. For example, in 3GPP LTE, the bandwidths of 1.4 MHz, 3 MHz, 5 MHz, 10 MHz, 15 MHz, and 20 MHz are supported, and in 3GPP LTE-A, the broadband of more than 20 MHz may be formed by using only the bandwidth of the 3GPP LTE system. Furthermore, the broadband may be formed by defining a new bandwidth without using the bandwidth of the conventional system as itself.

A plurality of base stations and UEs may communicate through up to 5 cells. The 5 cells may correspond to the bandwidth of the maximum 100 MHz. That is, the CA environment indicates a case where a specific UE has two or more configured serving cells (hereinafter, referred to as "cell") having different carrier frequencies. The carrier frequency represents the center frequency of a cell.

A cell shows combination of DL resources and optionally UL resources. That is, the cell certainly includes DL resources, and the UL resources combined with the DL resources may be optionally included. The DL resources may be a DL component carrier (CC). The UL resources may be a UL CC. When a specific UE includes one configured serving cell, the UE may include one DL CC and one UL CC. When a specific UE includes two or more cells, the UE may include DL CCs whose number is the same as the number of cells and UL CCs whose number is the same as or smaller than the number of cells. That is, when CA is supported in the current 3GPP LTE-A, the number of DL CCs may always be the same as or greater than the number of UL CCs. However, in the release after 3GPP LTE-A, a CA where the number of DL CCs is smaller than the number of UL CCs may be supported.

The linkage between the carrier frequency of the DL CC and the carrier frequency of the UL CC may be indicated by system information transmitted on the DL CC. The system information may be a system information block type 2 (SIB2).

Figure 7:
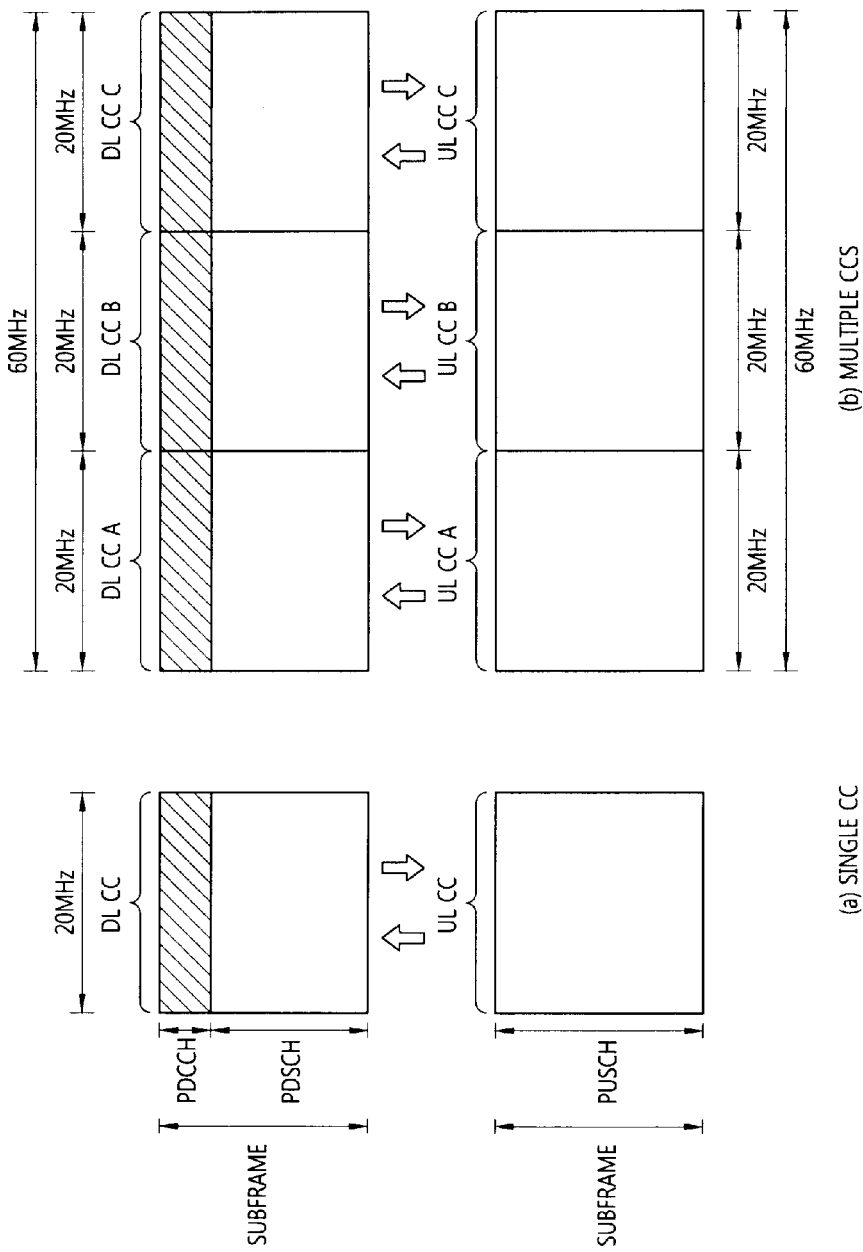
FIG. 7 shows an example of subframe structures of a single carrier system and a carrier aggregation system.

FIG. 7 shows an example of subframe structures of a single carrier system and a carrier aggregation system.

FIG. 7-(a) shows the single carrier system. It is assumed that a system bandwidth of FIG. 7-(a) is 20 MHz. Since the number of carriers is 1, each of a bandwidth of a DL CC transmitted by the base station and a bandwidth of a UL CC transmitted by the UE is also 20 MHz. The base station performs DL transmission through the DL CC and the UE performs UL transmission through the UL CC.

FIG. 7-(b) shows the carrier aggregation system. It is assumed that a system bandwidth of FIG. 7-(a) is 20 MHz. A downlink bandwidth is constituted by a DL CC A, a DL CC B, and a DL CC C which each have the bandwidth of 20 MHz. An uplink bandwidth is constituted by a UL CC A, a UL CC B, and a UL CC C which each have the bandwidth of 20 MHz. The base station performs the DL transmission through the DL CC A, the DL CC B, and the DL CC C and the UE performs the UL transmission through the UL CC A, the UL CC B, and the UL CC C. The DL CC A, the DL CC B, and the DL CC C and the UL CC A, the UL CC B, and the UL CC C may correspond to each other.

The UE may monitor and/or receive the DL signal and/or data transmitted from the plurality of DL CCs simultaneously. The base station may configure M DL CCs cell-specifically or UE-specifically so that the UE monitors only the DL signal and/or data transmitted from M DL CCs less than N DL CCs even though a cell manages N DL CCs. Further, the base station may configure L DL CCs cell-specifically or UE-specifically so as to monitor the DL signal and/or data transmitted from L DL CCs with priority among M DL CCs.

The UE which supports the CA may use a primary cell (PCell) and one or more secondary cells (SCell) for an increased bandwidth. That is, when there are two or more cells, one cell becomes a PCell, and the other cells become SCells. Both the PCell and the SCell may become a serving cell. The UE in the RRC_CONNECTED state where the CA is not supported or cannot be supported may have only one serving cell including only the PCell. The UE in the RRC_CONNECTED state which supports the CA may have one or more serving cells including the PCell and all SCells. Meanwhile, in the TDD system, the UL-DL configuration of all cells may be the same.

The PCell may be a cell which operates in a primary frequency. The PCell may be a cell where the UE performs radio resource control (RRC) connection with a network. The PCell may be a cell whose cell index is the smallest. The PCell may be a cell which tries a random access through a physical random access channel (PRACH) firstly among a plurality of cells. The PCell may be a cell where the UE performs an initial connection establishment process or a connection reestablishment process in a CA environment. Furthermore, the PCell may be a cell which is indicated in a handover process. The UE may obtain non-access stratum (NAS) mobility information (e.g., a tracking area indicator (TAI)) at the time of a RRC connection/reestablishment/handover through the PCell. Furthermore, the UE may obtain a security input at the time of RRC reestablishment/handover through the PCell. The UE may be allocated and transmit a PUCCH only in the PCell. Furthermore, the UE may apply system information acquisition and system information change monitoring only for the PCell. The network may change the PCell of the UE which supports the CA in the handover process by using RRCConnectionReconfiguration message including MobilityControlInfo.

The SCell may be a cell which operates in a secondary frequency. The SCell is used to provide additional wireless resources. The PUCCH is not allocated to the SCell. When adding the SCell, the network provides all system information related with the operation of the related cell in the RRC_CONNECED state to the UE through dedicated signaling. The change of the system information for the SCell may be performed by a release and addition of the related cell, and the network may independently add, remove, or change the SCell through a RRC connection reestablishment process which uses RRCConnectionReconfiguration message.

The LTE-A UE which supports the CA may simultaneously transmit or receive one or a plurality of CCs depending on the capacity. The LTE rel-8 UE may transmit or receive only one CC when each CC is compatible with the LTE rel-8 system. Hence, when the number of CCs used in the UL is the same as the number of CCs used in the DL, all CCs need to be configured to be compatible with the LTE rel-8. Furthermore, in order to efficiently use a plurality of CCs, a plurality of CCs may be managed in a media access control (MAC). When the CA is formed in the DL, the receiver in the UE should be able to receive a plurality of DL CCs, and when the CA is formed in the UL, the transmitter in the UE should be able to transmit a plurality of UL CCs.

As a CA environment is introduced, cross carrier scheduling may be applied. Through the cross carrier scheduling, the PDCCH on a specific DL CC may schedule the PDSCH on one DL CC among a plurality of DL CCs or schedule the PUSCH on one UL CC among a plurality of UL CCs. A carrier indicator field (CIF) may be defined for the cross carrier scheduling. The CIF may be included in the DCI format which is transmitted on the PDCCH. Whether the CIF exists within the DCI format may be indicated by the higher layer semi-statically or UE-specifically. When the cross carrier scheduling is performed, the CIF may indicate the DL CC where the PDSCH is scheduled or the UL CC where the PUSCH is scheduled. The CIF may be fixed three bits, and may exist in a fixed position regardless of the DCI format size. When the CIF does not exist within the DCI format, the PDCCH on a specific DL CC may schedule the PDSCH on the same DL CC or schedule the PUSCH on the UL CC which has a SIB2 linkage with the specific DL CC.

When the cross carrier scheduling is performed using the CIF, the base station may allocate the PDCCH monitoring DL CC aggregation in order to reduce complexity of the blind decoding of the UE. The PDCCH monitoring DL CC aggregation is a part of the whole DL CC, and the UE performs blind decoding only for the PDCCH within the PDCCH monitoring DL CC aggregation. That is, in order to schedule the PDSCH and/or PUSCH for the UE, the base station may transmit the PDCCH only through the DL CC in the PDCCH monitoring DL CC aggregation. The PDCCH monitoring DL CC aggregation may be set UE-specifically, UE-group-specifically or cell-specifically.

Figure 8:
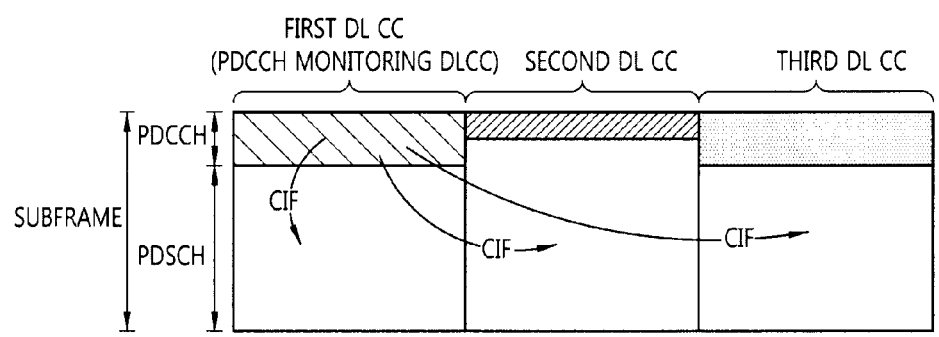
FIG. 8 shows an example of a subframe structure of 3GPP LTE-A system which is cross-carrier-scheduled through CIF.

FIG. 8 shows an example of a subframe structure of 3GPP LTE-A system which is cross-carrier-scheduled through CIF.

Referring to FIG. 8, a first DL CC among three DL CCs is set as a PDCCH monitoring DL CC. When the cross carrier scheduling is not performed, each DL CC schedules PDSCH by transmitting each PDCCH. When the cross carrier scheduling is performed, only the first DL CC which is set as the PDCCH monitoring DL CC transmits the PDCCH. The PDCCH which is transmitted on the first DL CC schedules the PDSCH of the second DL CC and the third DL CC by using CIF as well as the PDSCH of the first DL CC. The second DL CC and the third DL CC which are not set as the PDCCH monitoring DL CC do not transmit PDCCH.

Furthermore, the cross carrier scheduling is not supported in the PCell. That is, the PCell is always scheduled by its own PDCCH. The UL grant and DL assignment of the cell is always scheduled from the same cell. That is, if the DL in the cell is scheduled on the second carrier, the UL is also scheduled on the second carrier. The PDCCH order may be transmitted only on the PCell. Furthermore, frame timing, a super frame number (SFN) timing, etc, may be aligned in the aggregated cells.

The UE may monitor one CSS when the aggregation level is 4 or 8 on the PCell. The UE where the CIF has not been set monitors one USS when the aggregation level is one of 1, 2, 4, and 8 in each activated serving cell. As configured by the higher layer, the CIF-set UE monitors one or more USSs when the aggregation level is one of 1, 2, 4, and 8 on one or more activated serving cells. The CSS may overlap with the USS on the PCell.

The CIF-set UE associated with the PDCCH which is monitored in the serving cell of the serving cell and monitors the PDCCH including the CRC, which is scrambled by the C-RNTI and configured as the CIF, in the USS. The CIF-set UE associated with the PDCCH which is monitored in the PCell monitors the PDCCH including the CRC, which is scrambled by the SPS C-RNTI and configured as the CIF, in the USS of the PCell. Furthermore, the UE may monitor the PDCCH by searching the CSS without the CIF. For the serving cell on which the PDCCH is monitored, the UE in which the CIF has not been set monitors the USS without CIF for the PDCCH. The CIF-set UE monitors the USS through the CIF for the PDCCH. When configured to monitor the PDCCH in the SCell through the CIF in another serving cell, the UE may not monitor the PDCCH of the SCell.

In addition, the UE may transmit to the base station uplink control information including channel state information (CSI), the ACK/NACK signal, etc., received, detected, or measured from one or more DL CCs through one predetermined UL CC. The CSI may include a CQI, a PMI, an RI, etc. For example, when the UE needs to transmit an ACK/NACK signal regarding data received from a DL CC of a PCell and DL CCs of SCells, the UE may transmit to the base station a plurality of ACK/NACK signals regarding the data received from each DL CC through a PUCCH of a UL CC of the PCell by multiplexing or bundling the plurality of ACK/NACK signals. There are three cases that require transmission of the ACK/NACK signal regarding the DL CC in 3GPP LTE.

1) An ACK/NACK signal regarding PDSCH transmission instructed by a corresponding PDCCH in a subframe (n-k) may be transmitted in a subframe n. k∈K and K represents an aggregation of M elements $\{k_0, k_1, \ldots, k_{M-1}\}$ by the subframe n and a UL/DL configuration. This is a case in which an ACK/NACK signal regarding a general PDSCH is transmitted. The PDSCH may be present in both the PCell and the SCell.

2) An ACK/NACK signal regarding a PDCCH of a subframe (n-k), which instructs release of DL semi-persistent scheduling (SPS) may be transmitted in the subframe n. k∈K and K represents an aggregation of M elements $\{k_0, k_1, \ldots, k_{M-1}\}$ by the subframe n and a UL/DL configuration. An ACK/NACK signal regarding the PDCCH which instructs activation of the DL SPS is not transmitted. The PDCCH which instructs the release of the DL SPS may be present in only the PCell.

3) An ACK/NACK signal regarding PDSCH transmission with no corresponding PDCCH in the subframe (n-k) may be transmitted in the subframe n. k∈K and K represents an aggregation of M elements $\{k_0, k_1, \ldots, k_{M-1}\}$ by the subframe n and a UL/DL configuration. This is a case in which an ACK/NACK signal regarding SPS is transmitted. The PDSCH may be present in only the PCell.

In the above description, K represents a bundling window. That is, the bundling window represents one or more DL subframes corresponding to the ACK/NACK signal in one UL subframe. M=1 and $K=\{k_0\}=\{4\}$ in an FDD system. Table 3 shows an example of an aggregation K in a TDD system.

PDSCH so as to prevent the first PDSCH and the second PDSCH from being overlapped with each other by exchanging the scheduling information. As a result, the first PDSCH and the second PDSCH may be allocated to frequency domains which are orthogonal to each other in the frequency domains. Accordingly, the first PDSCH transmitted by the eNB1 may not interfere with a second UE UE2 and the second PDSCH transmitted by the eNB2 may not interfere with a first UE UE1. However, a first PDCCH transmitted by the eNB1 and a second PDCCH transmitted by the eNB2 may be transmitted in all subframes and the first PDCCH and the second PDCCH are allocated and transmitted to an entire DL bandwidth, and as a result, it may be difficult to avoid the interference.

Figure 10:
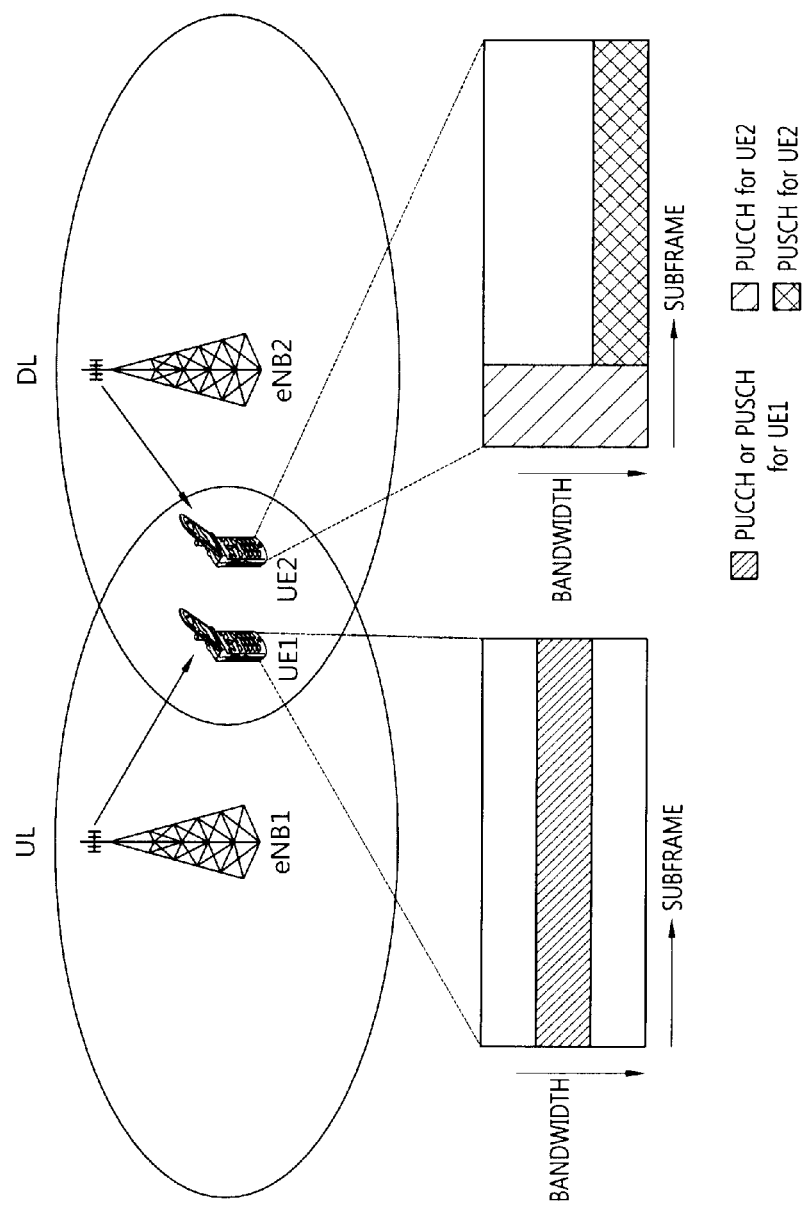
FIG. 10 shows an example of interference by different UL/DL configurations.

FIG. 10 shows an example of interference by different UL/DL configurations.

Even when respective base stations have different UL/DL configurations, the interference may occur. Referring to FIG. 10, the UE1 transmits the PUCCH to the eNB1. The eNB2 transmits the PDCCH and the PDSCH to the UE2. In this case, the PUCCH transmitted by the UE1 may interfere with the PDCCH and the PDSCH received by the UE2. Even in this case, when the scheduling information is exchanged between the eNB1 and the eNB the respective eNBs allocate the PDSCH to the frequency domains which are orthogonal to each other to avoid the interference to the PDSCH. However, since the PDCCH transmitted by the eNB2 is also allocated to the entire DL bandwidth and transmitted, it may be difficult to avoid the interference.

Additional introduction of the e-PDCCH may be discussed in addition a current PDCCH in order to reduce the influence of the interference. The e-PDCCH may be configured not to be overlapped with the existing PDCCH region. For example, the e-PDCCH may be configured after an OFDM symbol configuring the existing PDCCH. An OFDM symbol config-

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The UE may be interfered from a base station of the same type as a base station or a different type from a base station that receives a service in a cellular network based wireless communication system. Various methods for reducing an influence of interference from other base stations may be proposed. A method that allocates an almost blank subframe (ABS) to a cell that gives the interference may be proposed in order to relieve the interference of the PDSCH in a 3GPP LTE/LTE-A system. The cell that gives the interference may transmit no signal in the ABS. As a result, the UE may receive a signal without the interference of other cells. Alternatively, a frequency domain may be orthogonally allocated to each UE that is present at a cell edge by using inter-base station scheduling information.

Figure 9:
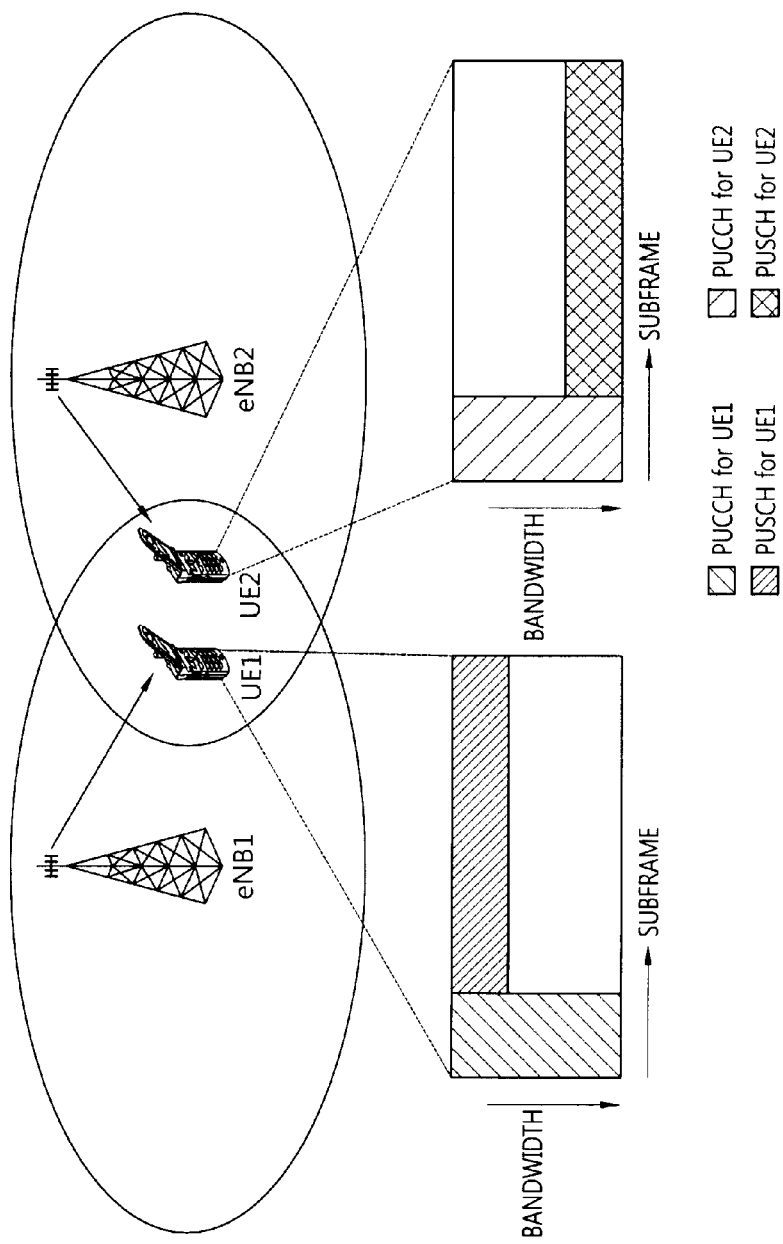
FIG. 9 shows an example of an interference relieving method of a PDSCH using scheduling.

FIG. 9 shows an example of an interference relieving method of a PDSCH using scheduling.

Referring to FIG. 9, a first base station eNB1 and a second base station eNB2 may allocate a first PDSCH and a second uring the PDCCH and an OFDM symbol configuring the e-PDCCH may be consecutive to each other. Alternatively, a start OFDM symbol of the e-PDCCH may be instructed by a separate radio resource control (RRC) signaling or PDCCH signaling. In this case, one or more symbols may be present between the PDCCH and the e-PDCCH in a time domain. In an embodiment below, it is assumed that the PDCCH and the e-PDCCH are consecutive in the time domain for convenience.

Figure 11:
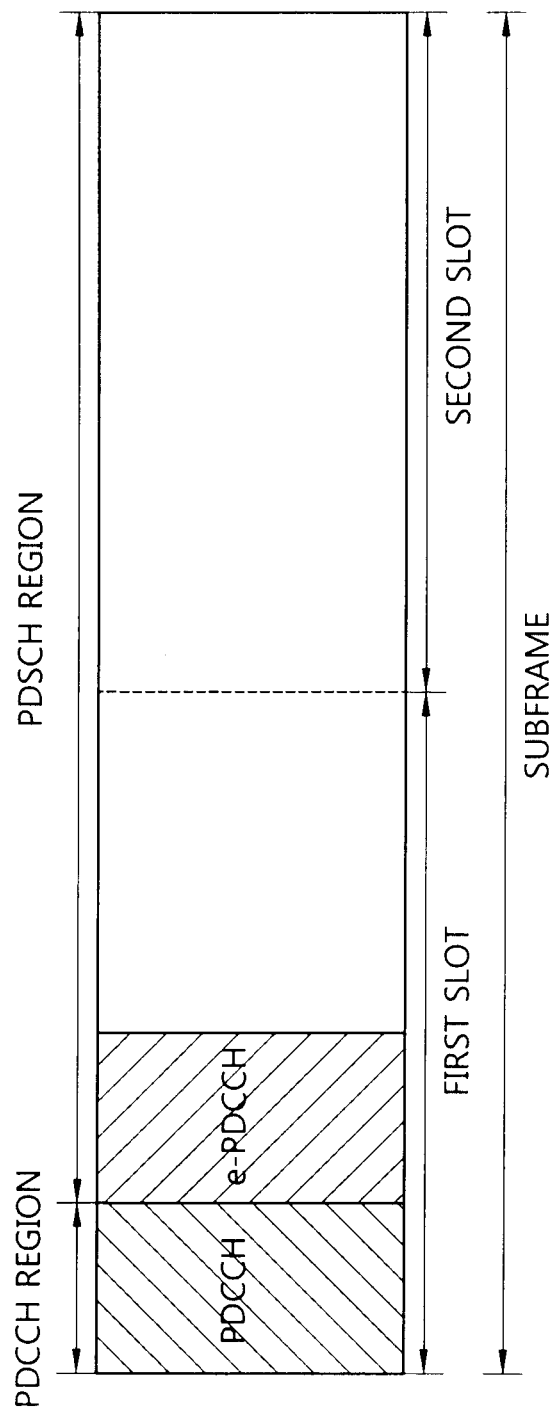
FIG. 11 shows an example of an e-PDCCH configuration.

FIG. 11 shows an example of an e-PDCCH configuration.

Referring to FIG. 11, the PDCCH region occupies first several OFDM symbols of the subframe. The number of the OFDM symbols occupied by the PDCCH may be instructed by a PCFICH. The e-PCCH may occupy first several consecutive OFDM symbols of the PDSCH region. The number of the OFDM symbols occupied by the e-PDCCH may be instructed by the RRC or the PDCCH.

Figure 12:
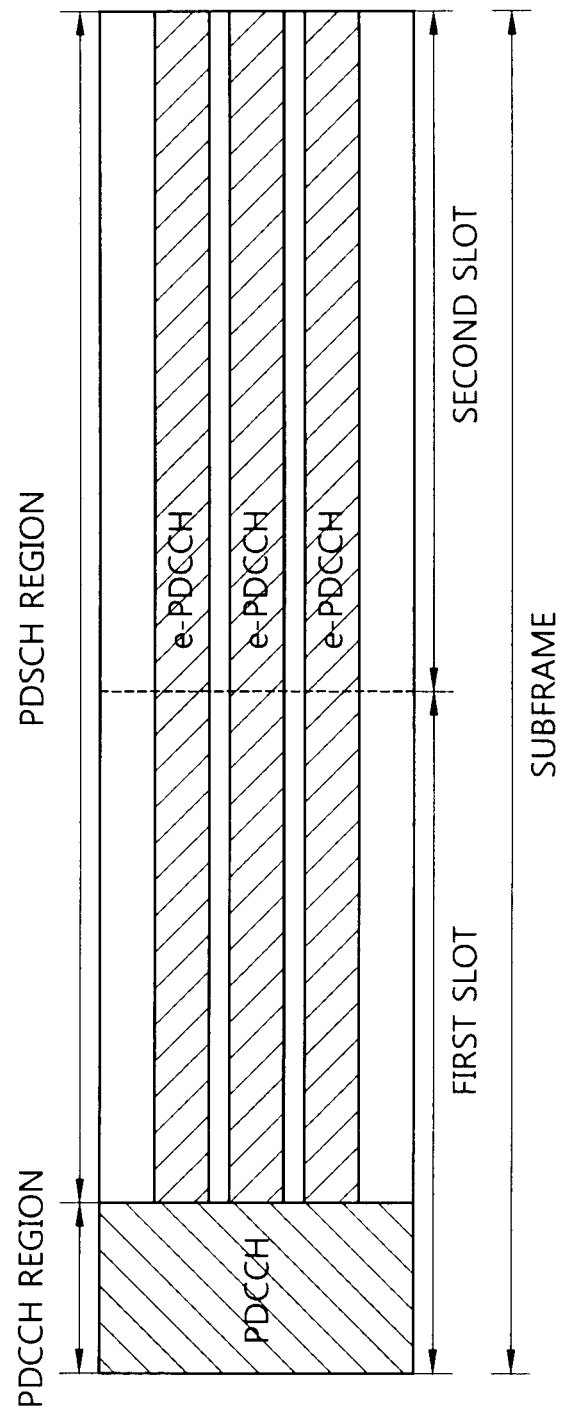
FIG. 12 shows another example of an e-PDCCH configuration.

FIG. 12 shows another example of an e-PDCCH configuration.

Referring to FIG. 12, the PDCCH region occupies first several OFDM symbols of the subframe. The number of the OFDM symbols occupied by the PDCCH may be instructed by the PCFICH. The e-PDCCH may be allocated to the PDSCH region other than the PDCCH region. A plurality of e-PDCCHs for a plurality of UEs may be allocated. The e-PDCCH for each UE may be multiplexed in a frequency division multiplexing (FDM) scheme. The frequency domain allocated with the e-PDCCH may be instructed by the RRC or the PDCCH.

Figure 13:
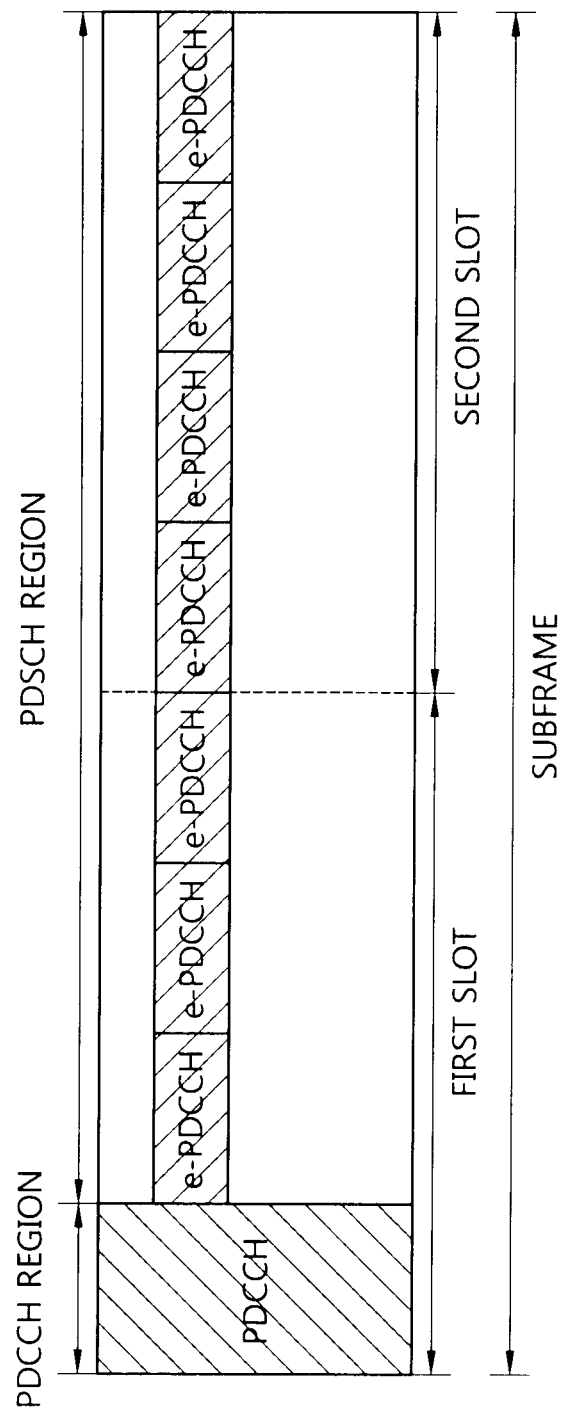
FIG. 13 shows another example of an e-PDCCH configuration.

FIG. 13 shows another example of an e-PDCCH configuration.

Referring to FIG. 13, the PDCCH region occupies first several OFDM symbols of the subframe. The number of the OFDM symbols occupied by the PDCCH may be instructed by the PCFICH. The e-PDCCH may be allocated to the PDSCH region other than the PDCCH region. The plurality of e-PDCCHs for the plurality of UEs may be allocated. The e-PDCCH for each UE may be multiplexed in a time division multiplexing (TDM) scheme. The frequency domain allocated with the e-PDCCH may be instructed by the RRC or the PDCCH.

Figure 14:
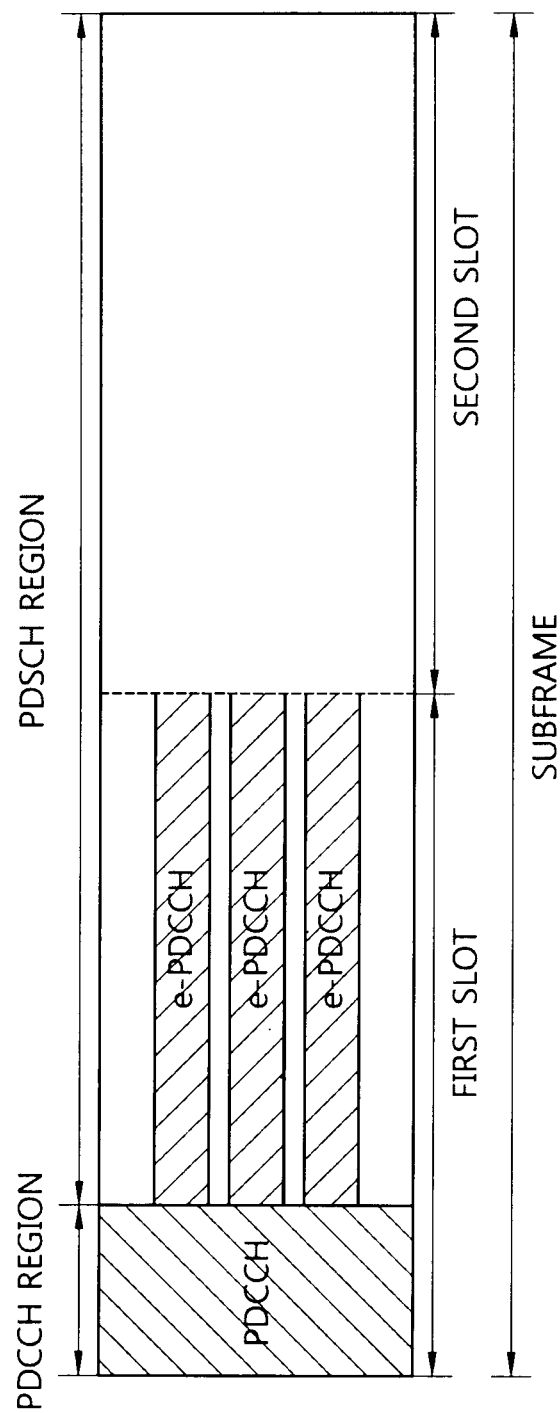
FIG. 14 shows another example of an e-PDCCH configuration.

FIG. 14 shows another example of an e-PDCCH configuration.

Referring to FIG. 14, the PDCCH region occupies first several OFDM symbols of the subframe. The number of the OFDM symbols occupied by the PDCCH may be instructed by the PCFICH. The e-PDCCH may be allocated to remnant OFDM symbols other than the PDCCH region in a first slot. The plurality of e-PDCCHs for the plurality of UEs may be allocated. The e-PDCCH for each UE may be multiplexed in the FDM scheme. The frequency domain allocated with the e-PDCCH may be instructed by the RRC or the PDCCH.

Figure 15:
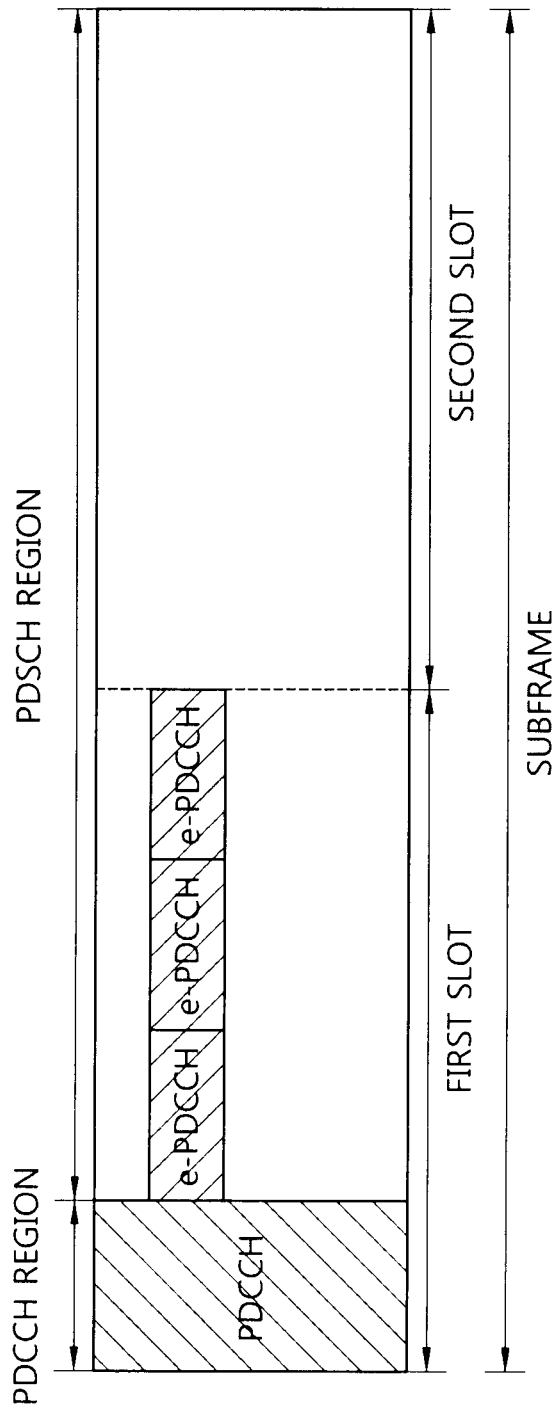
FIG. 15 shows another example of an e-PDCCH configuration.

FIG. 15 shows another example of an e-PDCCH configuration.

Referring to FIG. 15, the PDCCH region occupies first several OFDM symbols of the subframe. The number of the OFDM symbols occupied by the PDCCH may be instructed by the PCFICH. The e-PDCCH may be allocated to remnant OFDM symbols other than the PDCCH region in a first slot. The plurality of e-PDCCHs for the plurality of UEs may be allocated. The e-PDCCH for each UE may be multiplexed in the TDM scheme. The frequency domain allocated with the e-PDCCH may be instructed by the RRC or the PDCCH.

In the above embodiment, the UE may know the time domain or the frequency domain to which the e-PDCCH is allocated by the RRC signaling or the RRC configuration. Alternatively, the UE may know the time domain or the frequency domain to which the e-PDCCH is allocated through a predetermined specific format or field of a PDCCH by the RRC signaling or the RRC configuration.

Further, even when the base station instructs the frequency domain to which the e-PDCCH is allocated, various methods may be used. The base station may instruct a physical resource block (PRB) index or a virtual resource block (VRB) index allocated to the e-PDCCH among all PRBs or VRBs. Alternatively, the base station may instruct a PRB or VRB having a lowest index allocated to the e-PDCCH among all of the PRBs or VRBs. The UE may know the position of the PRB or VRB allocated to the e-PDCCH by a predetermined rule (for example, consecutive VRBs). The base station may instruct information on the number of PRBs or VRBs allocated to the e-PDCCH together. Alternatively, the base station may instruct the PRB or VRB allocated to the e-PDCCH through bitmaps for all of the PRBs or VRBs. For example, the bitmaps are configured as many as all of the PRBs or VRBs and each bit may instruct whether each PRB or each VRB is allocated to the e-PDCCH. For example, when a value of the bit is 0, it may be instructed that the corresponding PRB or VRB is not allocated to the e-PDCCH and when the value of the bit is 1, it may be instructed that the corresponding PRB or VRB is allocated to the e-PDCCH.

As a PUCCH resource index is determined from the PDCCH in LTE rel-8/9/10, there may be required a method for acquiring the PUCCH resource index from the e-PDCCH when the e-PDCCH is introduced. In the case of the explicit mapping method, the same method as the existing method may be used. However, in the case of the implicit mapping method, when the same method as the existing method is used, the PUCCH resource index determined from the existing PDCCH and the PUCCH resource index determined from the e-PDCCH may be redundant to each other. Therefore, the present invention proposes that a PUCCH resource determined by the implicit mapping method from the e-PDCCH is set to be different from a PUCCH resource determined by the implicit mapping method from the PDCCH. According to the present invention, a dynamic PUCCH region determined by the implicit mapping method from the PDCCH and a dynamic PUCCH region determined by the implicit mapping method from the e-PDCCH may be set to be not overlapped with each other.

Hereinafter, the implicit mapping method of the PUCCH resource means a method for determining the PUCCH resource index for transmitting the ACK/NACK signal according to a predetermined rule from a parameter associated with a resource of a corresponding control channel. The parameter associated with the resource of the control channel may be at least one of a CCE index, an RB index, an REG index, an RE index, and a slot index. The parameter associated with the resource of the control channel and the predetermined rule is not limited in the present invention. Further, a parameter for determining the PUCCH resource index from the PDCCH and a parameter for determining the PUCCH resource index from the e-PDCCH may be different from each other. In addition, even when the same parameter is used, substantial positions and/or meanings may be different from each other. For example, it is assumed that the CCE index of the PDCCH and the CCE index of the e-PDCCH are used in order to determine the PUCCH resource index. In this case, the CCE index for determining the PUCCH resource index from the PDCCH may mean a CCE index in the PDCCH region and the CCE index for determining the PUCCH resource index from the e-PDCCH may mean a CCE index in the e-PDCCH region.

For example, the PUCCH resource index may be determined as $n_{PUCCH}^{(1,p)}=n_{CCE}+N_{PUCCH}^{(1)}$ from the PDCCH in the FDD system, as described above. In this case, $N_{PUCCH}^{(1)}$ is a value configured by a higher layer. Further, the PUCCH resource index in which an ACK/NACK signal for a specific PDSCH is transmitted may be determined by a predetermined rule based on a smallest CCE index $n_{CCE}$ of the e-PDCCH scheduling the PDSCH. For example, the PUCCH resource index may be determined as $n_{PUCCH}^{(1,p)}=n_{CCE}+N_{PUCCH}^{(1)}$ in an FDD system. In this case, $N_{PUCCH}^{(1)}$ is a value configured by a higher layer. Herein, $n_{CCE}$ may be used without division, but actually, a different index such as $n_{CCE}'$, etc., may be applied. Hereinafter, it is assumed that both of the CCE index of the PDCCH and the CCE index of the e-PDCCH are instructed without particular division.

As another example, the PUCCH resource index in which an ACK/NACK signal for a specific PDSCH is transmitted may be determined by a predetermined rule based on a smallest RB index $n_{RB}$ constituting of the e-PDCCH scheduling the PDSCH. For example, the PUCCH resource index may be determined as $n_{PUCCH}^{(1,p)} = n_{RB} + N_{PUCCH}^{(1)}$ in an FDD system. In this case, $N_{PUCCH}^{(1)}$ is a value configured by a higher layer. For easy description, $n_{RB}$ is used, but a function of $n_{RB}$ may be used.

Hereinafter, the method for determining the PUCCH resource index by the implicit mapping method from the e-PDCCH is described in more detail. According to the present invention, the static PUCCH region corresponding to the existing PUCCH may be used as a dynamic PUCCH region corresponding to a newly introduced e-PDCCH. As a result, the dynamic PUCCH region corresponding to the PDCCH and the dynamic PUCCH region corresponding to the e-PUCCH may be allocated without being overlapped with each other.

Figure 16:
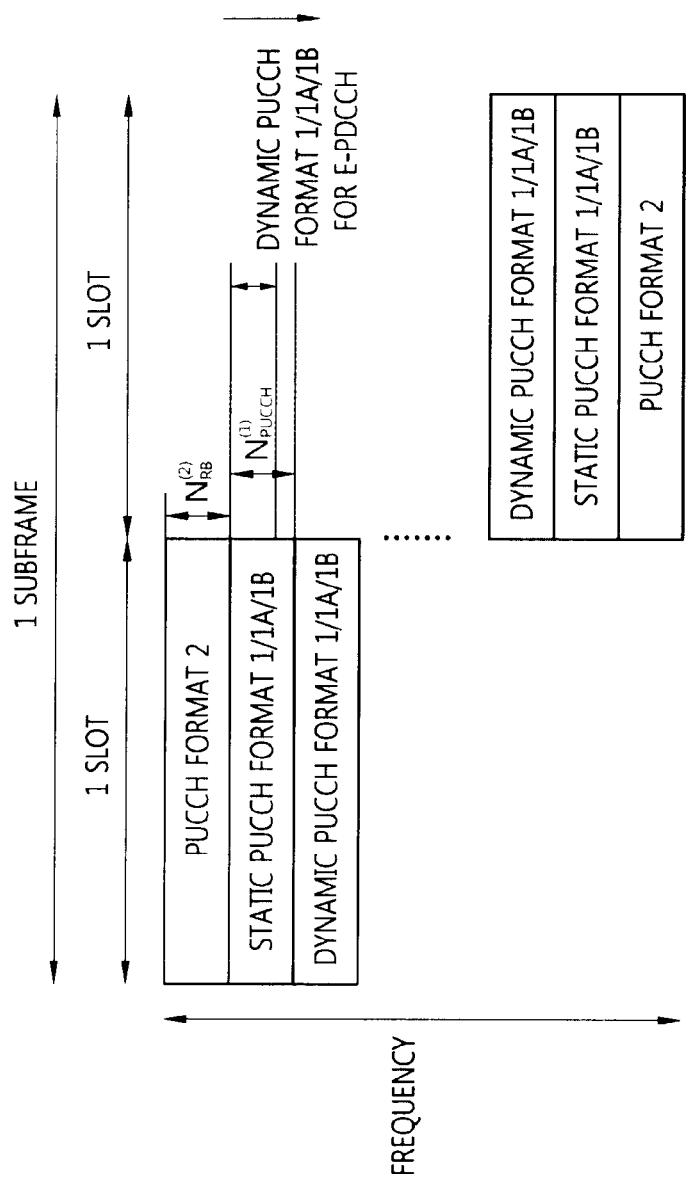
FIG. 16 shows an example of a PUCCH format 1/1a/1b region corresponding to an e-PDCCH allocated according to an embodiment of the present invention.

FIG. 16 shows an example of a PUCCH format 1/1a/1b region corresponding to an e-PDCCH allocated according to an embodiment of the present invention.

Referring to FIG. 16, the PUCCH resource determined by the implicit mapping method from the e-PDCCH may be allocated in a direction from a resource having a small index to a resource having a large index in a static PUCCH region corresponding to the PDCCH. That is, the PUCCH region corresponding to the e-PDCCH and the static PUCCH region corresponding to the PDCCH may be started at the same position. Alternatively, the dynamic PUCCH region corresponding to the e-PDCCH may start at a position separated from a start point of the static PUCCH region corresponding to the PDCCH by an offset. The size of the dynamic PUCCH region corresponding to the e-PDCCH may be smaller or larger than the size of the static PUCCH region corresponding to the PDCCH.

For example, when the dynamic PUCCH region corresponding to the e-PDCCH and the static PUCCH region corresponding to the PDCCH starts at the same position, the PUCCH resource index may be determined as $n_{PUCCH} = n_{CCE}$. Hereinafter, the equation will be extended and described for easy description. Alternatively, by limiting the PUCCH resource allocated by the implicit mapping method from the e-PDCCH, allocation of the static PUCCH region and the dynamic PUCCH region corresponding to the PDCCH may be assured. To this end, modular arithmetic may be used and the PUCCH resource index may be determined as $n_{PUCCH} = n_{CCE}$ mod $Dynamic_{max}$ or $n_{PUCCH} = n_{CCE}$ mod $(N_{PUCCH}^{(1)} - Dynamic_{max})$. A parameter $Dynamic_{max}$ may be determined in advance or signaled through physical (PHY), media access control (MAC), or RRC. The PUCCH region corresponding to the e-PDCCH may be smaller than the static PUCCH region corresponding to the PDCCH by the parameter $Dynamic_{max}$, and as a result, the base station may use a remaining static PUCCH region corresponding to a PDCCH according to an existing purpose. When the PUCCH region corresponding to the e-PDCCH is larger than the static PUCCH region corresponding to the PDCCH by the parameter $Dynamic_{max}$, the base station needs to perform scheduling limitation so as not to use a dynamic PUCCH region corresponding to an existing redundant PDCCH.

When the dynamic PUCCH region corresponding to the e-PDCCH starts at a position separated from the start point of the static PUCCH region corresponding to the PDCCH by an offset, the PUCCH resource index may be determined as $n_{PUCCH} = n_{CCE} + N_{PUCCH}^{(e)}$ or $n_{PUCCH} = n_{CCE} + (N_{PUCCH}^{(1)} - N_{PUCCH}^{(e)})$. A parameter $N_{PUCCH}^{(e)} \geq 0$ and $N_{PUCCH}^{(e)}$ may be determined in advance or signaled through the PHY, the MAC, or the RRC. As a result, a head of the static PUCCH region may be used according to the existing purpose. Alternatively, by limiting the PUCCH resource allocated by the implicit mapping method from the e-PDCCH, allocation of the static PUCCH region and the dynamic PUCCH region corresponding to the PDCCH may be assured. To this end, the modular arithmetic may be used and the PUCCH resource index may be determined as $n_{PUCCH} = (n_{CCE} + N_{PUCCH}^{(e)})$ mod $Dynamic_{max}$ or $n_{PUCCH} = [n_{CCE} + (N_{PUCCH}^{(1)} - N_{PUCCH}^{(e)})]$ mod $(N_{PUCCH}^{(1)} - Dynamic_{max})$. The parameter $Dynamic_{max}$ may be determined in advance or signaled through the PHY, the MAC, or the RRC. Further, instead of $N_{PUCCH}^{(e)}$, a parameter $N_{PUCCH}^{(1)'} = N_{PUCCH}^{(1)} - N_{PUCCH}^{(e)}$ may be newly defined. $N_{PUCCH}^{(1)'}$ may be determined in advance or signaled similarly as $n_{PUCCH}^{(1)}$. In this case, $n_{PUCCH} = n_{CCE} + N_{PUCCH}^{(1)'}$ may be determined.

The method described above may be applied for a first antenna port. When a plurality of antenna ports is used to transmit the PUCCH, a PUCCH resource index for an n (n=0, 1, 2, 3, . . . )-th antenna port may be determined by applying $n_{CCE} + n$ instead of $n_{CCE}$ in the aforementioned equation. Alternatively, the PUCCH resource index for the n-th antenna port may be determined by adding n to $n_{PUCCH}$ in the aforementioned equation. That is, the PUCCH resource index for the n-th antenna port may be determined as $n_{PUCCH}^n = n_{PUCCH} + n$.

Meanwhile, the base station may allocate the PUCCH resource corresponding to the PDCCH or the e-PDCCH by the explicit mapping method. In this case, the PUCCH resource allocated by the explicit mapping method may be allocated to a remaining area of the static PUCCH region except for the dynamic PUCCH region corresponding to the e-PDCCH.

Figure 17:
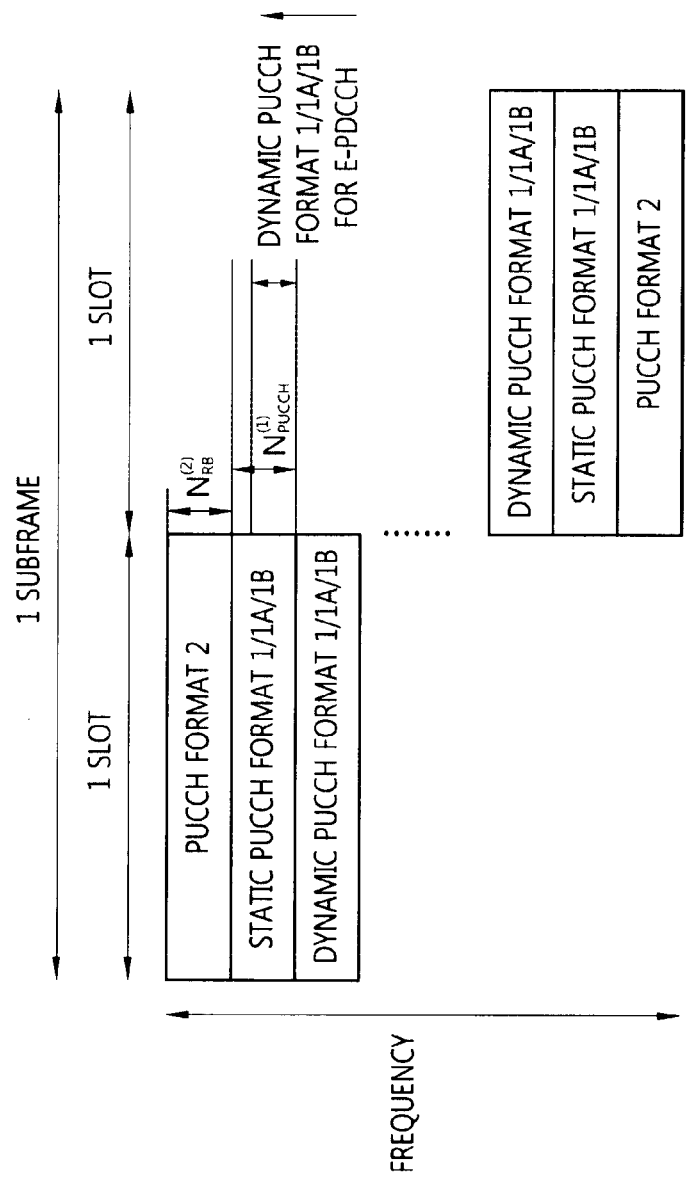
FIG. 17 shows another example of a PUCCH format 1/1a/1b region corresponding to an e-PDCCH allocated according to the embodiment of the present invention.

FIG. 17 shows another example of a PUCCH format 1/1a/1b region corresponding to an e-PDCCH allocated according to the embodiment of the present invention.

Referring to FIG. 17, the PUCCH resource determined by the implicit mapping method from the e-PDCCH may be allocated in a direction from a resource having a large index to a resource having a small index in the static PUCCH region corresponding to the PDCCH. That is, the PUCCH region corresponding to the e-PDCCH starts at the same position as the dynamic PUCCH region corresponding to the PUCCH, but allocation directions and orders of the PUCCH region and the dynamic PUCCH region may be opposite to each other. Alternatively, the dynamic PUCCH region corresponding to the e-PDCCH may start at a position separated from a start point of the dynamic PUCCH region corresponding to the PDCCH by an offset. The size of the dynamic PUCCH region corresponding to the e-PDCCH may be smaller or larger than the size of the static PUCCH region corresponding to the PDCCH.

For example, when the dynamic PUCCH region corresponding to the e-PDCCH starts at the same position as the dynamic PUCCH region corresponding to the PDCCH, the PUCCH resource index may be determined as $n_{PUCCH} = N_{PUCCH}^{(1)} - n_{CCE}$. Hereinafter, the equation will be extended and described for easy description. Alternatively, the PUCCH resource index may be determined as $n_{PUCCH} = N_{PUCCH}^{(1)} - n_{CCE} - 1$. In this case, '−1' is to completely separate the dynamic PUCCH region corresponding to the PDCCH and the dynamic PUCCH region corresponding to the e-PDCCH. When $n_{CCE} = 0$, the resource index of the dynamic PUCCH region corresponding to the PDCCH is determined as $n_{PUCCH} = n_{CCE} + N_{PUCCH}^{(1)} = N_{PUCCH}^{(i)}$ and the resource index of the dynamic PUCCH region corresponding to the e-PDCCH is determined as $n_{PUCCH} = N_{PUCCH}^{(1)} - n_{CCE} - 1 = N_{PUCCH}^{(1)} - 1$. As a result, the dynamic PUCCH region corresponding to the PDCCH and the dynamic PUCCH region corresponding to the e-PUCCH are not overlapped with each other. Further, a region where the dynamic PUCCH region corresponding to the e-PDCCH may not use a region allocated to PUCCH format 2. To this end, the modular arithmetic may be used, and the PUCCH resource index may be determined as $n_{PUCCH}=N_{PUCCH}^{(1)}-(n_{CCE} \mod N^{PUCCH(1)})$ or $n_{PUCCH}=N_{PUCCH}^{(1)}-(n_{CCE} \mod N^{PUCCH(1)})-1$.

Alternatively, by limiting the PUCCH resource allocated by the implicit mapping method from the e-PDCCH, allocation of the static PUCCH region and the dynamic PUCCH region corresponding to the PDCCH may be assured. To this end, the modular arithmetic may be used, and the PUCCH resource index may be determined as $n_{PUCCH}=N_{PUCCH}^{(1)}-N_{CCE} \mod Dynamic_{max}$), $n_{PUCCH}=N_{PUCCH}^{(1)}-[n_{CCE} \mod (N_{PUCCH}^{(1)}-Dynamic_{max})]$, $n_{PUCCH}=N_{PUCCH}^{(1)}-(n_{CCE} \mod Dynamic_{max})-1$, or $n_{PUCCH}=N_{PUCCH}^{(1)}-[n_{CCE} \mod (N_{PUCCH}^{(1)}-Dynamic_{max})]-1$. The parameter $Dynamic_{max}$ may be determined in advance or signaled through the PHY, the MAC, or the RRC. The PUCCH region corresponding to the e-PDCCH may be smaller than the static PUCCH region corresponding to the PDCCH by the parameter $Dynamic_{max}$, and as a result, the base station may use the remaining static PUCCH region corresponding to the PDCCH according to the existing purpose. When the PUCCH region corresponding to the e-PDCCH is larger than the static PUCCH region corresponding to the PDCCH by the parameter $Dynamic_{max}$, the base station needs to perform scheduling limitation so as not to use a dynamic PUCCH region corresponding to an existing redundant PDCCH.

When the dynamic PUCCH region corresponding to the e-PDCCH starts at a position separated from the start point of the dynamic PUCCH region or an end point of the static PUCCH region corresponding to the PDCCH by an offset, the PUCCH resource index may be determined as $n_{PUCCH}=(N_{PUCCH}^{(1)}-N_{PUCCH}^{(e)})-n_{CCE}$ or $n_{PUCCH}=(N_{PUCCH}^{(1)}-N_{PUCCH}^{(e)})-n_{CCE}-1$. The parameter $N_{PUCCH}^{(e)} \geq 0$ and $N_{PUCCH}^{(e)}$ may be determined in advance or signaled through the PHY, the MAC, or the RRC. As a result, a tail of the static PUCCH region may be used according to the existing purpose. In this case, '−1' is to completely separate the dynamic PUCCH region corresponding to the PDCCH and the dynamic PUCCH region corresponding to the e-PDCCH. When $n_{CCE}=0$ and $n_{PUCCH}^{(e)}=0$, the resource index of the dynamic PUCCH region corresponding to the PDCCH is determined as $n_{PUCCH}=n_{CCE}+N_{PUCCH}^{(1)}=N_{PUCCH}^{(1)}$ and the resource index of the dynamic PUCCH region corresponding to the e-PDCCH is determined as $n_{PUCCH}=(N_{PUCCH}^{(1)}-N_{PUCCH}^{(e)})-n_{CCE}-1=N_{PUCCH}^{(1)}-1$. As a result, the dynamic PUCCH region corresponding to the PDCCH and the dynamic PUCCH region corresponding to the e-PUCCH are not overlapped with each other. Further, a region where the dynamic PUCCH region corresponding to the e-PDCCH may not use a region where the PUCCH format 2 is allocated. To this end, the modular arithmetic may be used, and the PUCCH resource index may be determined as $n_{PUCCH}=(N_{PUCCH}^{(1)}-N_{PUCCH}^{(e)})-(n_{CCE} \mod (N_{PUCCH}^{(1)}-N_{PUCCH}^{(e)}))$ or $n_{PUCCH}=(N_{PUCCH}^{(1)}-N_{PUCCH}^{(e)})-(n_{CCE} \mod (N_{PUCCH}^{(1)}-N_{PUCCH}^{(e)}))-1$.

Alternatively, by limiting the PUCCH resource allocated by the implicit mapping method from the e-PDCCH, allocation of the static PUCCH region and the dynamic PUCCH region corresponding to the PDCCH may be assured. To this end, the modular arithmetic may be used and the PUCCH resource index may be determined as $n_{PUCCH}=(N_{PUCCH}^{(1)}-N_{PUCCH}^{(e)})-(n_{CCE} \mod Dynamic_{max})$ or $n_{PUCCH}=(N_{PUCCH}^{(1)}-N_{PUCCH}^{(e)})-(n_{CCE} \mod Dynamic_{max})-1$. The parameter $Dynamic_{max}$ may be determined in advance or signaled through the PHY, the MAC, or the RRC. Further, instead of $N_{PUCCH}^{(e)}$, a parameter $N_{PUCCH}^{(1)'}=N_{PUCCH}^{(1)}-N_{PUCCH}^{(e)}$ may be newly defined. $N_{PUCCH}^{(1)'}$ may be determined in advance or signaled similarly as $n_{PUCCH}^{(1)}$. In this case, $n_{PUCCH}=N_{PUCCH}^{(1)'}-n_{CCE}-1$ may be determined.

The method described above may be applied for a first antenna port. When the plurality of antenna ports is used to transmit the PUCCH, the PUCCH resource index for the n (n=0, 1, 2, 3, . . . )-th antenna port may be determined by applying $n_{CCE}+n$ instead of $n_{CCE}$ in the aforementioned equation. Alternatively, the PUCCH resource index for the n-th antenna port may be determined by subtracting n from $n_{PUCCH}$ in the aforementioned equation. That is, the PUCCH resource index for the n-th antenna port may be determined as $n_{PUCCH}''=n_{PUCCH}-n$ or $n_{PUCCH}''=n_{PUCCH}-n-1$.

Meanwhile, the base station may allocate the PUCCH resource corresponding to the PDCCH or the e-PDCCH by the explicit mapping method. In this case, the PUCCH resource allocated by the explicit mapping method may be allocated to a remaining region of the static PUCCH region except for the dynamic PUCCH region corresponding to the e-PDCCH.

Further, in order to allocate the dynamic PUCCH region corresponding to the PDCCH and the dynamic PUCCH region without overlapping, a method for determining the dynamic PUCCH region corresponding to the e-PDCCH by applying an offset may be proposed. The offset may be applied to the CCE index or a search space. When an aggregation level of the PDCCH is any one of 2, 4, and 8, the PDCCH starts in a CCE of an even-numbered index. That is, $n_{CCE}$ used to determine the PUCCH resource index always becomes an even number. On the contrary, an odd-numbered CCE index is used to determine the PUCCH resource index when the aggregation level of the PDCCH is 1, a use frequency may be relatively low. Accordingly, a method for determining the PUCCH resource index corresponding to the e-PDCCH by using the odd-numbered CCE index may be proposed. As a result, the dynamic PUCCH region corresponding to the PDCCH and the dynamic PUCCH region corresponding to the e-PUCCH may be allocated without being overlapped with each other.

1) First, the offset may be applied to the CCE index. That is, when the PUCCH resource index determined by the implicit mapping method from the PDCCH is $n_{PUCCH}=n_{CCE}+N_{PUCCH}^{(1)}$, the PUCCH resource index determined by the implicit mapping method may be $n_{PUCCH}=n_{CCE}+\alpha+N_{PUCCH}^{(1)}$. An offset α may be pre-determined. For example, α=−1 or α=1 may be pre-determined. Alternatively, (aggregation level−1) or (aggregation level+1) may be pre-determined.

When the aggregation level of the PDCCH is any one of 2, 4, and 8, the PDCCH starts in the CCE of the even-numbered index. Accordingly, CCEs of all odd-numbered indices within a corresponding CCE index may be used to determine the PUCCH resource index of the dynamic PUCCH region corresponding to the e-PDCCH. In this case, the offset α=1 is determined, and as a result, the PUCCH resource index may be always determined from the CCE of the odd-numbered index. As a result, when the aggregation level of the PDCCH is any one of 2, 4, and 8, the dynamic PUCCH region corresponding to the PDCCH and the dynamic PUCCH region corresponding to the e-PDCCH may not be overlapped with each other. Meanwhile, when the aggregation level of the PDCCH is 1, the dynamic PUCCH region corresponding to the PDCCH and the dynamic PUCCH region corresponding to the e-PDCCH may be redundant, but the redundancy may be prevented by scheduling of the base station. For example, when the base station transmits the PDCCH having the aggregation level of 1 and when the offset α=1, the base station should not allocate the e-PDCCH in which an index occupied by the PDCCH is $n_{CCE}-1$.

Alternatively, only when an index of a smallest CCE of the e-PDCCH is the even number, the offset may be applied. That is, the PUCCH resource index determined by the implicit mapping method from the e-PDCCH may be determined as $n_{PUCCH}=n_{CCE}+N_{PUCCH}^{(1)}$ when the index of the smallest CCE of the e-PDCCH is an odd number and $n_{PUCCH}=n_{CCE}+\alpha+N_{PUCCH}^{(1)}$ when the index of the smallest CCE of the e-PDCCH is the even number.

2) The offset may be applied to a search space $S_k^{(L)}$. That is, when the search space of the PDCCH is determined by Equation 1, the search space of the e-PDCCH may be determined by Equation 3.

$$L\{(Y_k+m') \bmod \lfloor N_{CCE,k}/L \rfloor\}+i+\alpha \qquad \text{<Equation 3>}$$

The offset α may be per-determined in Equation 3. For example, α=−1 or α=1 may be pre-determined. Alternatively, (aggregation level−1) or (aggregation level+1) may be pre-determined.

When the aggregation level of the PDCCH is any one of 2, 4, and 8, all indices having a smallest CCE of the search space become the even number. Accordingly, CCEs of all odd-numbered indices within the corresponding CCE index may be used to determine the PUCCH resource index of the dynamic PUCCH region corresponding to the e-PDCCH. In this case, the offset α=1 is determined, and as a result, the PUCCH resource index may be always determined from the CCE of the odd-numbered search space or the odd-numbered index. As a result, when the aggregation level of the PDCCH is any one of 2, 4, and 8, the dynamic PUCCH region corresponding to the PDCCH and the dynamic PUCCH region corresponding to the e-PDCCH may not be overlapped with each other. Meanwhile, when the aggregation level of the PDCCH is 1, the dynamic PUCCH region corresponding to the PDCCH and the dynamic PUCCH region corresponding to the e-PDCCH may be redundant, but the redundancy may be prevented by scheduling of the base station. For example, the base station transmits the PDCCH having the aggregation level of 1 and when the offset α=, the base station should not allocate the e-PDCCH in which an index occupied by the PDCCH is $n_{CCE}-1$.

Alternatively, only when the aggregation level is the even number, the offset may be applied. That is, the PUCCH resource index determined by the implicit mapping method from the e-PDCCH may be determined by Equation 1 when the aggregation level is the odd number and by Equation 3 when the aggregation level is the even number.

3) The offset may be applied to a variable $Y_k$ for determining the search space. When the aggregation level is 4 or 8 in the CSS of the PDCCH, $Y_k$ is set to 0. When the aggregation level in USS $S_k^{(L)}$ is L, $Y_k$ is determined by Equation 2. When the aggregation level is 4 or 8 in the CSS of the e-PDCCH, $Y_k$ is set to α. When the aggregation level in USS $S_k^{(L)}$ is L, $Y_k$ is determined by Equation 4.

$$Y_k=(A \cdot Y_{K-1}) \bmod D+ \qquad \text{<Equation 4>}$$

The offset α may be pre-determined in Equation 4. For example, α=−1 or α=1 may be pre-determined in advance. Alternatively, (aggregation level−1) or (aggregation level+1) may be pre-determined.

When the aggregation level of the PDCCH is any one of 2, 4, and 8, all indices having a smallest CCE of the search space become the even number. Accordingly, CCEs of all odd-numbered indices within the corresponding CCE index may be used to determine the PUCCH resource index of the dynamic PUCCH region corresponding to the e-PDCCH. In this case, the offset α=1 is determined, and as a result, the PUCCH resource index may be always determined from the CCE of the odd-numbered search space or the odd-numbered index. As a result, when the aggregation level of the PDCCH is any one of 2, 4, and 8, the dynamic PUCCH region corresponding to the PDCCH and the dynamic PUCCH region corresponding to the e-PDCCH may not be overlapped with each other. Meanwhile, when the aggregation level of the PDCCH is 1, the dynamic PUCCH region corresponding to the PDCCH and the dynamic PUCCH region corresponding to the e-PDCCH may be redundant, but the redundancy may be prevented by scheduling of the base station. For example, the base station transmits the PDCCH having the aggregation level of 1 and when the offset α=1, the base station should not allocate the e-PDCCH in which an index occupied by the PDCCH is $n_{CCE}-1$.

Alternatively, only when $N_{CCE,k}$ or the aggregation level is the even number, the offset may be applied. That is, the PUCCH resource index is set to 0 when $N_{CCE,k}$ is the odd number and α when $N_{CCE,k}$ is the even number in the case where the aggregation level is 4 or 8 in the CSS. In the USS, when the aggregation level is the odd number, $Y_k(A \cdot Y_{K-1})$ mod D may be determined and when the aggregation level is the even number, $Y_k=(A \cdot Y_{K-1})$ mod D+α may be determined.

Meanwhile, in the above description, e-PDCCH may not be searched in the CSS. In the above description, the search space of the e-PDCCH is not limited in the present invention.

Figure 18:
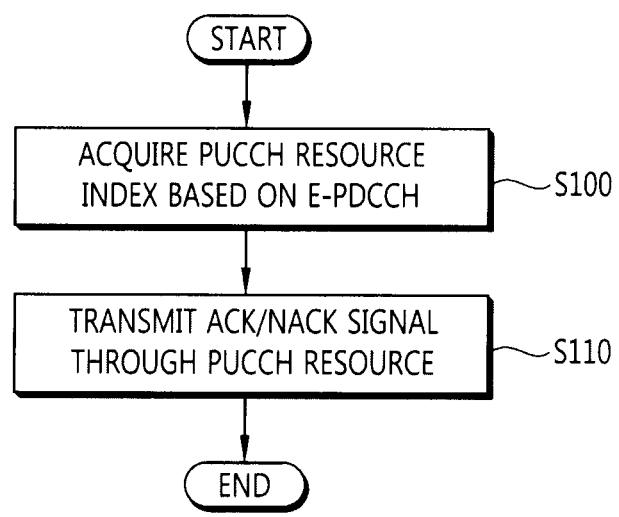
FIG. 18 shows an embodiment of the proposed method for acquiring an PUCCH resource index.

FIG. 18 shows an embodiment of the proposed method for acquiring an PUCCH resource index.

In step S100, the UE acquires the PUCCH resource index based on the e-PDCCH. The PUCCH resource index may be acquired by the implicit mapping method and may be acquired by various methods described above. That is, the PUCCH resource acquired based on the e-PDCCH may be positioned at the static PUCCH region corresponding to the PDCCH. The PUCCH resource acquired based on the e-PDCCH may be allocated in a direction in which the index is increased from the start point of the static PUCCH region corresponding to the PDCCH or in a direction in which the index is decreased from the end point of the static PUCCH region. In step S110, the UE transmits the ACK/NACK signal to the base station through the acquired PUCCH resource.

Hereinafter, according to the present invention, the method for allocating the PUCCH resource by the explicit mapping method from the e-PDCCH is described. The present invention proposes defining an ACK/NACK resource indicator (ARI) within the DCI format, which is transmitted through the e-PDCCH, for the explicit mapping method. Herein, the DCI format may be any one of the DCI format of the existing LTE rel-8/9/10 or a DCI format which is newly defined after LTE rel-11.

The ARI may be defined within the DCI format transmitted through the e-PDCCH scheduling the PDSCH or the e-PDCCH instructing releasing the DL SPS. The PUCCH resource index may be determined, which is used to transmit the ACK/NACK signal for at least one of the PDSCH scheduled by the e-PDCCH, the e-PDCCH instructing releasing the DL SPS, and the DL SPS, based on the ARI. In this case, the ACK/NACK signal may include the ACK/NACK signal for the PDSCH scheduled by the existing PDCCH, the PDCCH instructing releasing the DL SPS, and the DL SPS.

The PUCCH resource index may be determined based on the ARI by a method described below.

1) The ARI may directly indicate the PUCCH resource index. That is, the ARI may directly indicate $n_{PUCCH}^{(1)}$ or $n_{PUCCH}^{(3)}$ to be used or configured from the higher layer. In this case, in order to reduce signaling overhead or configuration overhead, the ARI may indicate not all PUCCH resource indices but only some PUCCH resource indices. For example, $n_{PUCCH}^{(1)}=k+N_{PUCCH}^{(1)}$ may be determined. k may represent a signaled value and $N_{PUCCH}^{(1)}$ may be a value signaled from the higher layer.

2) The ARI may indicate a PUCCH resource index to be actually used among the PUCCH resource indices configured from the higher layer. The base station may configure an aggregation of n PUCCH resource indices through the higher layer and thereafter, indicate a PUCCH resource index to be used in the PUCCH resource index aggregation through the ARI of m bits. For example, when n=4, the PUCCH resource index aggregation may be {a, b, c, d}. In this case, each of a, b, c, and d may have a value of 0 to 1023. In this case, when m=2 and the value of the ARI is '10', the used PUCCH resource index may be determined as c.

As another example, the base station may configure k sets of n PUCCH resource indices through the higher layer and thereafter, indicate a PUCCH resource index to be used in each PUCCH resource index aggregation through the ARI of m bits. For example, when n=4 and k=2, two PUCCH resource index sets may be {a, b, c, d} and {e, f, g, h}. In this case, each of a, b, c, d, e, f, g, and h may have a value of 0 to 1023. In this case, m=2 and when the value of the ARI is '10', the used PUCCH resource index may be determined as c and g in each PUCCH resource index set. That is, a plurality of resource indices may be determined through one ARI. When PUCCH transmission diversity is applied, such a method may be used.

As another example, the base station may configure k sets of n PUCCH resource indices that make a pair through the higher layer and thereafter, indicate a PUCCH resource index to be used in each PUCCH resource index aggregation through the ARI of m bits. For example, when n=4 and k=2, four PUCCH resource index sets may be {a,b}, {c,d}, {e,f}, and {g,h}. In this case, each of a, b, c, d, e, f, g, and h may have a value of 0 to 1023. In this case, when m=2 and the value of the ARI is '10', the used PUCCH resource index may be determined as {e,f} in the PUCCH resource index set. Alternatively, when n=4 and k=2, four PUCCH resource index sets may be {a,e}, {b,f}, {c,g}, and {d,h} and when m=2 and the value of the ARI is '10', the used PUCCH resource index may be determined as {c,g} in the PUCCH resource index set. That is, the plurality of resource indices may be determined through one ARI. When the PUCCH transmission diversity is applied, such a method may be used.

The ARI may be configured as below.

1) The ARI may be configured only in the e-PDCCH transmitted through the USS. When the ARI is additionally defined in the DCI format, the length of the DCI format may be increased, and as a result, the number of blind decoding times of the e-PDCCH of the UE may be increased. In order to prevent such a problem, the ARI may be configured only in the e-PDCCH transmitted through the USS.

To this end, the e-PDCCH requiring the ACK/NACK response, such as the e-PDCCH scheduling the PDSCH or instructing releasing the DL SPS may be transmitted only in the USS. For example, the PDCCH requiring the ACK/NACK response such as the PUCCH format 1/1a/1b may be continuously only in the USS. As a result, the UE may always receive the ARI through the e-PDCCH.

Alternatively, the e-PDCCH requiring the ACK/NACK response may be transmitted in the USS and the PDCCH may be transmitted through the CSS. When the UE receives one or more e-PDCCHs, the PUCCH resource index may be determined through the ARI configured within the e-PDCCH. However, when the UE receives only the PDCCH, the UE may not determine the PUCCH resource index from the ARI. In this case, the UE may determine the PUCCH resource by using the implicit mapping method. That is, the UE may determine the PUCCH resource index based on the smallest CCE index of the PDCCH. Alternatively, the UE may use a PUCCH resource index for the PUCCH format 1/1a/1b depending on channel selection determined based on the smallest CCE index of the PDCCH.

2) The ARI may be configured even in the e-PDCCH transmitted through the CSS and the PDCCH transmitted through the CSS and/or the USS in addition to the e-PDCCH transmitted through the USS.

To this end, the e-PDCCH requiring the ACK/NACK response may be transmitted through the CSS or the USS. All of the DCI formats transmitted through the e-PDCCH in the CSS and the USS may include the ARI. The UE may always receive the ARI and determine the PUCCH resource index based on the ARI.

Alternatively, the base station may transmit the e-PDCCH requiring the ACK/NACK response through only the USS and the PDCCH requiring the ACK/NACK response may be transmitted through the CSS and/or the USS. In this case, all of the DCI formats transmitted through the e-PDCCH in the USS and the DCI format transmitted through the PDCCH in the CSS and/or the USS may include the ARI. However, a new ARI field may be added to the DCI format transmitted through the e-PDCCH in the USS and the DCI format transmitted through the PDCCH in the CSS and/or the USS may use an existing transmit power control (TPC) field as the ARI. That is, positions occupied by the ARI in the DCI format transmitted through the e-PDCCH in the USS and in the DCI format transmitted through the PDCCH in the CSS and/or the USS may be different from each other. The UE may always receive the ARI and determine the PUCCH resource index based on the ARI.

When the ARI is transmitted through the PDCCH, a range may be limited. For example, when a downlink assignment index (DAI) within the DCI format=1, the TPC field is used for an original purpose and only in the case of remaining DAI values, the TPC field may be used as the ARI. Alternatively, when the DAI within the DCI format=1, the TPC field is used as the ARI and in the case of the remaining DAI values, the TPC field may be used for the original purpose. In this case, the UE may distinguish the ARI and the TPC field according to a defined condition. When the UE does not receive the e-PDCCH and the PDCCH which does not include the ARI, the UE may not determine the PUCCH resource index from the ARI. In this case, the UE may determine the PUCCH resource by using the implicit mapping method. That is, the UE may determine the PUCCH resource index based on the smallest CCE index of the PDCCH. Alternatively, the UE may use the PUCCH resource index for the PUCCH format 1/1a/1b depending on the channel selection determined based on the smallest CCE index of the PDCCH.

3) A specific field within the existing DCI format or the DCI format newly defined after the LTE rel-11 may be used as the ARI under a specific condition. As a result, since the length of the DCI format including the ARI is maintained to be the same as the existing DCI format or a DCI format 3/3A not requiring the ACK/NACK response, additional blinding decoding for the e-PDCCH of the UE is not required.

The TPC field in the DCI format may be used as the ARI. In the TDD system, the UE transmits ACK/NACK signals for one or more DL subframes through one UL subframe. Therefore, the UE may receive one or more PDCCHs, and as a result, the UE may receive one or more TPC fields. The UE may control accumulated power by one or more TPC fields, but even though some of the TPC fields are used for a different usage, a significant problem does not occur in the power control. Further, since the TPC fields may be transmitted from a plurality of cells by a CA environment, some of the TPC fields are used for the different usage, the significant problem does not occur in the power control.

The TPC field may be used as the ARI under a specific condition. For example, only the TPC field of the DCI format transmitted through the PDCCH scheduling the PDSCH transmitted in the PCell or the PDCCH instructing releasing the DL SPS may be used as the ARI. As another example, DAI=1 and only the TPC field of the DCI format transmitted through the PDCCH scheduling the PDSCH transmitted in the PCell or the PDCCH instructing releasing the DL SPS may be used as the ARI. As another example, DAI is not 1 and only the TPC field of the DCI format transmitted through the PDCCH scheduling the PDSCH transmitted in the PCell or the PDCCH instructing releasing the DL SPS may be used as the ARI. In this case, the UE may distinguish the ARI and the TPC field according to a defined condition. When the UE does not receive the e-PDCCH, but receives only the PDCCH which does not include the ARI, the UE may not determine the PUCCH resource index from the ARI. In this case, the UE may determine the PUCCH resource by using the implicit mapping method. That is, the UE may determine the PUCCH resource index based on the smallest CCE index of the PDCCH. Alternatively, the UE may use the PUCCH resource index for the PUCCH format 1/1a/1b depending on the channel selection determined based on the smallest CCE index of the PDCCH.

Alternatively, a DAI field in the DCI format may be used as the ARI. In the TDD system, the UE transmits ACK/NACK signals for one or more DL subframes through one UL subframe. In this case, the base station may notify an accumulation count of each DL subframe within a bundling window to the UE through the DAI so that the UE checks whether there is a skipped DL subframe among the DL subframes. When the UE receives a discontinued DAI, the UE may find that there is a skipped PDCCH and transmit the ACK/NACK signal by reflecting the skipping of the PDCCH. However, the DAI field is not used in the FDD system. Therefore, in the FDD system, the DAI field may be used as the ARI. Alternatively, a UL DAI field may be used as the ARI.

When the specific field in the DCI format is used as the ARI under the specific condition, the e-PDCCH requiring the ACK/NACK response may be transmitted in only the USS. For example, the PDCCH requiring the ACK/NACK response such as the PUCCH format 1/1a/1b may be continuously only in the USS. The UE may receive the ARI through the specific field in the DCI format transmitted through the e-PDCCH.

Alternatively, when the specific field in the DCI format is used as the ARI under the specific condition, the e-PDCCH requiring the ACK/NACK response may be transmitted in the CSS or the USS. All of the DCI formats transmitted through the e-PDCCH in the CSS and the USS may include the ARI. The UE may always receive the ARI and determine the PUCCH resource index based on the ARI.

Hereinafter, a method for acquiring the PUCCH resource index by using the ARI is described. Hereinafter, it is assumed that the maximum number of PUCCH resources required for the PUCCH format 1b depending on the channel selection is 4, but this is for easy description and the method may be extended and applied for more PUCCH resources. Further, more PUCCH resources may be extended and applied for the PUCCH transmission diversity.

First, a method using the ARI for the PUCCH format 1b depending on the channel selection in the FDD system is described.

1) Two to four PUCCH resources may be acquired through the ARI. In this case, all ARIs in the bundling window may have the same value.

The base station configures four sets having four PUCCH resource indices through the RRC, respectively. The UE may receive the DCI format through the e-PDCCH scheduling the PDSCH in the bundling window or the e-PDCCH instructing releasing the DL SPS from all configured serving cells. The UE may determine how many PUCCH resource indices are used in each aggregation by using the ARI of 2 bits in the DCI format. In this case, it is assumed that the ARIs received from all configured serving cells are the same as each other.

2) One or two PUCCH resources may be acquired through the ARI transmitted on the PCell and one or two PUCCH resources may be acquired through the ARI transmitted on the SCell. All of the ARIs transmitted on the PCell in the bundling window have the same value and all of the ARIs transmitted on the SCell in the bundling window have the same value.

The base station configures four sets having four PUCCH resource indices through the RRC, respectively. The UE may receive the DCI format through the e-PDCCH scheduling the PDSCH in the bundling window or the e-PDCCH instructing releasing the DL SPS from the PCell. The UE may determine how many PUCCH resource indices in each aggregation are used as first and second PUCCH resource indices $n_{PUCCH,0}^{(1)}$ and $n_{PUCCH,1}^{(1)}$ (alternatively, the first PUCCH resource index $n_{PUCCH,0}^{(1)}$)) for transmitting the PUCCH by using the ARI of 2 bits in the DCI format. In this case, it is assumed that all of the ARIs received from the PCell are the same as each other. Further, the UE may receive the DCI format through the e-PDCCH scheduling the PDSCH in the bundling window from the SCells. The UE may determine how many PUCCH resource indices in each aggregation are used as third and fourth PUCCH resource indices $n_{PUCCH,2}^{(1)}$ and $n_{PUCCH,3}^{(1)}$ (alternatively, the second PUCCH resource index $n_{PUCCH,1}^{(1)}$)) for transmitting the PUCCH by using the ARI of 2 bits in the DCI format. In this case, it is assumed that all of the ARIs received from the SCell are the same as each other.

That is, the UE receives different ARIs from the PCell and the SCell to select a plurality of different PUCCH resource indices. The PUCCH resource index sets selected through the ARIs in the PCell and the SCell may be two same sets and may be total four sets as two different sets.

A method using the ARI for the PUCCH format 1b depending on the channel selection in the TDD system is described. In this case, it is assumed that bundling is not applied in a time domain. This may be a TDD mode a. It may be determined whether spatial bundling, inter-code bundling, or inter-transport block bundling may be applied according to a payload. For example, when the payload is 4 bits or less, the spatial bundling is not applied and when the payload is more than 4 bits, the spatial bundling may be applied.

1) Two to four PUCCH resources may be acquired through the ARI. In this case, all ARIs in the bundling window may have the same value. This is the same as 1) in the method using the ARI for the PUCCH format 1b depending on the channel selection in the FDD system described above.

2) One or two PUCCH resources may be acquired through the ARI transmitted on the PCell and one or two PUCCH resources may be acquired through the ARI transmitted on the SCell. This is the same as 2) in the method using the ARI for the PUCCH format 1b depending on the channel selection in the FDD system described above. All of the ARIs transmitted on the PCell in the bundling window have the same value and all of the ARIs transmitted on the SCell in the bundling window have the same value. The UE receives different ARIs from the PCell and the SCell to select the plurality of different PUCCH resource indices.

3) The base station configures four sets having four PUCCH resource indices through the RRC, respectively. The UE may receive the DCI format in which DAI=1 through the e-PDCCH scheduling the PDSCH in the bundling window or the e-PDCCH instructing releasing the DL SPS from the PCell. The UE may determine how many PUCCH resource indices in each aggregation are used as the first PUCCH resource index $n_{PUCCH,0}^{(1)}$) for transmitting the PUCCH by using the ARI of 2 bits in the DCI format. The UE may receive the DCI format in which DAI=2 through the e-PDCCH scheduling the PDSCH in the bundling window or the e-PDCCH instructing releasing the DL SPS from the PCell. The UE may determine how many PUCCH resource indices in each aggregation are used as the second PUCCH resource index $n_{PUCCH,1}^{(1)}$) for transmitting the PUCCH by using the ARI of 2 bits in the DCI format. Further, the UE may receive the DCI format in which DAI=1 through the e-PDCCH scheduling the PDSCH in the bundling window or the e-PDCCH instructing releasing the DL SPS from the SCell. The UE may determine how many PUCCH resource indices in each aggregation are used as the third PUCCH resource index $n_{PUCCH,2}^{(1)}$ for transmitting the PUCCH by using the ARI of 2 bits in the DCI format. The UE may receive the DCI format in which DAI=2 through the e-PDCCH scheduling the PDSCH in the bundling window or the e-PDCCH instructing releasing the DL SPS from the PCell. The UE may determine how many PUCCH resource indices in each aggregation are used as the fourth PUCCH resource index $n_{PUCCH,3}^{(1)}$ for transmitting the PUCCH by using the ARI of 2 bits in the DCI format.

That is, the UE receives different ARIs from the PCell and the SCell to select a plurality of different PUCCH resource indices according to the DAI. In the above embodiment, the DCI formats in which DAI=1 and 2 are received on the PCell and the SCell, and the PUCCH resource index is selected by using the ARI in the DCI format, but the present invention is not limited thereto. When the ARI is defined by using the existing field such as the TPC field, the TPC field in the DCI format to which the DAI does not correspond may be used for the existing purpose. Further, the PUCCH resource index sets selected through the ARIs in the PCell and the SCell may be two same sets and may be total four sets as two different sets.

A method using the ARI for the PUCCH format 1b depending on the channel selection in the TDD system is described. In this case, it is assumed that the bundling is applied in the time domain. This may be a TDD mode b. It may be determined whether the spatial bundling, the inter-code bundling, or the inter-transport block bundling may be applied according to the payload.

1) Two to four PUCCH resources may be acquired through the ARI. In this case, all ARIs in the bundling window may have the same value. This is the same as 1) in the method using the ARI for the PUCCH format 1b depending on the channel selection in the TDD mode a described above.

2) One or two PUCCH resources may be acquired through the ARI transmitted on the PCell and one or two PUCCH resources may be acquired through the ARI transmitted on the SCell. This is the same as 2) in the method using the ARI for the PUCCH format 1b depending on the channel selection in the TDD mode a described above. All of the ARIs transmitted on the PCell in the bundling window have the same value and all of the ARIs transmitted on the SCell in the bundling window have the same value. The UE receives different ARIs from the PCell and the SCell to select the plurality of different PUCCH resource indices.

3) The UE may receive different ARIs from the PCell and the SCell and select a plurality of different PUCCH resource indices according to the DAI. This is the same as 3) in the method using the ARI for the PUCCH format 1b depending on the channel selection in the TDD mode a described above.

4) The base station configures three or four sets having four PUCCH resource indices through the RRC, respectively. The UE may determine whether one PUCCH resource index indicated by 2 bits among four PUCCH resource indices is used the first PUCCH resource index $n_{PUCCH,0}^{(1)}$) for transmitting the PUCCH in SPS activation, for the ACK/NACK response for the PDSCH, in which the corresponding e-PDCCH in the bundling window is not present, transmitted from the PCell. That is, the PUCCH resource index selected when only the SPS is received is selected as the first PUCCH resource index for the ACK/NACK response. This is to transmit the ACK/NACK response to the SPS through the same PUCCH resource index in the case where only the SPS is received and in the case where the SPS and other information are together received. Therefore, the ACK/NACK response to the SPS may be fixed to HARQ-ACK(0), that is, the first ACK/NACK response among a plurality of ACK/NACK responses regardless the position in the bundling window. Thereafter, the UE may receive the DCI format in which DAI=1 through the e-PDCCH scheduling the PDSCH in the bundling window or the e-PDCCH instructing releasing the DL SPS from the PCell. The UE may determine how many PUCCH resource indices in each aggregation are used as the second PUCCH resource index $n_{PUCCH,1}^{(1)}$) for transmitting the PUCCH by using the ARI of 2 bits in the DCI format. Further, the UE may receive the DCI format in which DAI=1 through the e-PDCCH scheduling the PDSCH in the bundling window or the e-PDCCH instructing releasing the DL SPS from the SCell. The UE may determine how many PUCCH resource indices in each aggregation are used as the third PUCCH resource index $n_{PUCCH,2}^{(1)}$) for transmitting the PUCCH by using the ARI of 2 bits in the DCI format. The UE may receive the DCI format in which DAI=2 through the e-PDCCH scheduling the PDSCH in the bundling window or the e-PDCCH instructing releasing the DL SPS from the PCell. The UE may determine how many PUCCH resource indices in each aggregation are used as the fourth PUCCH resource index $n_{PUCCH,3}^{(1)}$ for transmitting the PUCCH by using the ARI of 2 bits in the DCI format.

That is, the UE receives different ARIs from the PCell and the SCell to select a plurality of different PUCCH resource indices according to the SPS and the DAI. In the above embodiment, the DCI formats in which DAI=1 and 2 are received on the PCell and the SCell, and the PUCCH resource index is selected by using the ARI in the DCI format, but the present invention is not limited thereto. When the ARI is defined by using the existing field such as the TPC field, the TPC field in the DCI format to which the DAI does not correspond may be used for the existing purpose. Further, the PUCCH resource index sets selected through the ARIs in the PCell and the SCell may be one or two redundant sets and may be total four sets as three or four different sets.

5) The method of 3) and the method of 4) may be selected and applied according to the presence of the SPS. That is, when the SPS is present in the bundling window of the PCell, the method of 4) may be applied and when the SPS is not present, the method of 3) may be applied.

For PUCCH format 3, two to four PUCCH resources may be acquired through the ARI. In this case, all ARIs in the bundling window may have the same value.

The base station configures one aggregation having four PUCCH resource indices through the RRC. The UE may receive the DCI format through the e-PDCCH scheduling the PDSCH in the bundling window or the e-PDCCH instructing releasing the DL SPS from all configured serving cells. The UE may determine how many PUCCH resource indices are used in each aggregation by using the ARI of 2 bits in the DCI format. In this case, it is assumed that the ARIs received from all configured serving cells are the same as each other. One or more sets may be configured in order to support the PUCCH transmission diversity. That is, the base station may configure two sets and the UE may select the PUCCH resource indices in each aggregation by using the ARI one by one. In addition, the UE may transmit the ACK/NACK signal by using different PUCCH resource indices for each antenna port.

Figure 19:
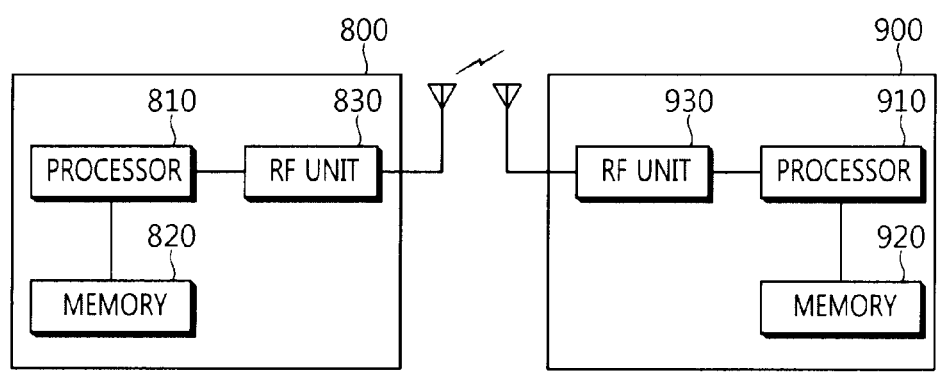
FIG. 19 is a block diagram showing wireless communication system to implement an embodiment of the present invention.

FIG. 19 is a block diagram showing wireless communication system to implement an embodiment of the present invention.

A base station 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for acquiring, by a user equipment, a physical uplink control channel (PUCCH) resource index in a wireless communication system, the method comprising:
    acquiring a PUCCH resource index indicating a first dynamic PUCCH region corresponding to an enhanced physical downlink control channel (e-PDCCH); and
    transmitting an acknowledgement/non-acknowledgement (ACK/NACK) signal to a base station based on the acquired PUCCH resource index,
    wherein the PUCCH resource index is acquired based on the smallest control channel element (CCE) index to which the e-PDCCH is allocated, and
    wherein the first dynamic PUCCH region corresponding to the e-PDCCH is not overlapped with a second dynamic PUCCH region corresponding to a PDCCH.

2. The method of claim 1, wherein the first dynamic PUCCH region is allocated in a static PUCCH format 1/1a/1b region.

3. The method of claim 2, wherein the first dynamic PUCCH region is allocated in a direction in which an index is increased from a start point of the static PUCCH format 1/1a/1b region.

4. The method of claim 2, wherein the first dynamic PUCCH region is allocated in a direction in which an index is increased from an index separated from a start point of the static PUCCH format 1/1a/1b region by an offset.

5. The method of claim 2, wherein the first dynamic PUCCH region is allocated in a direction in which an index is decreased from an end point of the static PUCCH format 1/1a/1b region.

6. The method of claim 2, wherein the first dynamic PUCCH region is allocated in a direction in which an index is increased from an index separated from an end point of the static PUCCH format 1/1a/1b region by the offset.

7. The method of claim 1, wherein the e-PDCCH is allocated to a data region in a subframe.

8. The method of claim 1, wherein the PUCCH resource index is acquired based on an offset.

9. The method of claim 8, wherein the offset is applied to the smallest CCE index to which the e-PDCCH is allocated.

10. The method of claim 8, wherein the offset is applied to a search space to which the e-PDCCH is transmitted.

11. The method of claim 8, wherein the offset is applied to a variable $Y_k$ for determining a search space to which the e-PDCCH is transmitted.

12. The method of claim 8, wherein the offset is 1.

13. The method of claim 8, wherein the offset is applied when the smallest CCE index to which the e-PDCCH is allocated or an aggregation level is an even number.

14. A user equipment (UE) for acquiring a physical uplink control channel (PUCCH) resource index in a wireless communication system, the UE comprising:
    a radio frequency (RF) for unit transmitting or receiving a radio signal; and
    a processor connected to the RF unit, and configured to:
    acquire a PUCCH resource index indicating a first dynamic PUCCH region corresponding to an enhanced physical downlink control channel (e-PDCCH); and
    transmit an acknowledgement/non-acknowledgement (ACK/NACK) signal to a base station based on the acquired PUCCH resource index, wherein the PUCCH resource index is acquired based on the smallest control channel element (CCE) index to which the e-PDCCH is allocated, and wherein the first dynamic PUCCH region corresponding to the e-PDCCH is not overlapped with a second dynamic PUCCH region corresponding to a PDCCH.

* * * * *